(12) United States Patent
Hur et al.

(10) Patent No.: US 7,916,244 B2
(45) Date of Patent: Mar. 29, 2011

(54) LIQUID CRYSTAL DISPLAY HAVING HIGH LUMINANCE AND HIGH DISPLAY QUALITY

(75) Inventors: Seung-Hyun Hur, Cheonan-si (KR); Kweon-Sam Hong, Seoul (KR); Woo-Sung Sohn, Seoul (KR); Bae-Heuk Yim, Asan-si (KR); Hyun-Ho Kang, Ahnsan-si (KR); Jae-Yong Shin, Daegu (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 214 days.

(21) Appl. No.: 12/389,098

(22) Filed: Feb. 19, 2009

(65) Prior Publication Data
US 2009/0207328 A1 Aug. 20, 2009

(30) Foreign Application Priority Data
Feb. 20, 2008 (KR) ........................ 10-2008-0015425

(51) Int. Cl.
G02F 1/1335 (2006.01)
(52) U.S. Cl. ............ 349/106; 349/56; 349/84; 349/107; 349/108
(58) Field of Classification Search ............... 349/56, 349/84, 103, 107, 108
See application file for complete search history.

(56) References Cited

U.S. PATENT DOCUMENTS 6,829,028 B2 * 12/2004 Lai et al. ................. 349/130
7,675,580 B2 * 3/2010 Rho ........................ 349/12

FOREIGN PATENT DOCUMENTS

| JP | 2007206230 | 8/2007 |
| KR | 1020050064176 | 6/2005 |
| KR | 1020070081924 | 8/2007 |

OTHER PUBLICATIONS

English Abstract for Publication No. 1020050064176, Jun. 29, 2005.
English Abstract for Publication No. JP2007206230, Aug. 16, 2007.
English Abstract for Publication No. 1020070081924, Aug. 20, 2007.

* cited by examiner

*Primary Examiner* — Jennifer Doan
(74) *Attorney, Agent, or Firm* — F. Chau & Associates, LLC

(57) ABSTRACT

A liquid crystal display (LCD) having high luminance and color renditions is provided. The liquid crystal display includes a first insulating substrate, a gate line and a data line crossing each other on the first insulating substrate to define a pixel. First and second sub-pixel electrodes divide the pixel into two parts. A first switching element drives the first sub-pixel electrode and a second switching element drives the second sub-pixel electrode. A second insulating substrate faces the first insulating substrate. A color pattern is arranged on the second insulating substrate and overlaps the first sub-pixel electrode. A contrast pattern overlaps the second sub-pixel electrode.

20 Claims, 21 Drawing Sheets

LIQUID CRYSTAL DISPLAY HAVING HIGH LUMINANCE AND HIGH DISPLAY QUALITY

CROSS-REFERENCE TO RELATED APPLICATION

This application claims priority to Korean Patent Application No. 10-2008-0015425, filed on Feb. 20, 2008, in the Korean Intellectual Property Office, the disclosure of which is incorporated herein in its entirety by reference.

BACKGROUND OF THE INVENTION

1. Technical Field

The present invention relates to a liquid crystal display (LCD), and more particularly to a liquid crystal display having a high luminance and a high display quality.

2. Discussion of the Related Art

A liquid crystal display (LCD), which is one of the most widely used types of flat panel displays (FPDs), includes two substrates on which electrodes are formed and a liquid crystal layer interposed between the two substrates. In such a liquid crystal display, liquid crystal molecules of the liquid crystal layer are rearranged in accordance with voltages being applied to the electrodes, and thus the quantity of light passing through the liquid crystal layer is adjusted.

One form of LCD is a vertical alignment (VA) mode LCD. In the VA mode LCD, main directors of the liquid crystal molecules are arranged at right angles to the upper and lower substrates when no electric field is applied thereto. The VA mode LCD has a high contrast ratio and a wide viewing angle. However, in the VA mode LCD, the display is less visible when viewed from an angle than when viewed straight on. In order to increase the visibility of the VA LCD when viewed at an angle, each pixel is divided into a pair of sub-pixels, a switching element is formed for each sub-pixel, and a separate voltage is applied to each sub-pixel.

A liquid crystal display, such as a digital information display (DID), requires more than twice the luminance of a conventional liquid crystal display. However, according to the conventional liquid crystal display, the intensity of light being supplied from a backlight is considerably reduced as the light passes through a color filter, and thus the total luminance of the liquid crystal display is lowered.

SUMMARY OF THE INVENTION

Exemplary embodiments of the present invention provide a liquid crystal display (LCD) with high luminance and color renditions.

Exemplary embodiments of the present invention provide a liquid crystal display (LCD), which includes a first insulating substrate, a gate line and a data line crossing each other on the first insulating substrate to define a pixel, first and second sub-pixel electrodes dividing the pixel into two parts, a first switching element driving the first sub-pixel electrode, a second switching element driving the second switching element, a second insulating substrate facing the first insulating substrate, a color pattern arranged on the second insulating substrate and overlapping the first sub-pixel electrode, and a contrast pattern overlapping the second sub-pixel electrode.

In an aspect of the present invention, there is provided a liquid crystal display (LCD), which includes a first insulating substrate, first and second gate lines arranged in parallel with each other on the first insulating substrate, a data line crossing the first and second gate lines, a first sub-pixel electrode electrically connected to the first gate line and the data line, a second sub-pixel electrode electrically connected to the second gate line and the data line, a second insulating substrate arranged opposite to the first insulating substrate, a color pattern arranged on the second insulating substrate and overlapping the first sub-pixel electrode, and a contrast pattern overlapping the second sub-pixel electrode. The first and second sub-pixel electrodes are formed in zigzag fashion along the data line.

BRIEF DESCRIPTION OF THE DRAWINGS

The above and other objects, features and aspects of exemplary embodiments of the present invention will be more apparent from the following detailed description taken in conjunction with the accompanying drawings, in which.

DETAILED DESCRIPTION OF EXEMPLARY EMBODIMENTS

Figure 1A:
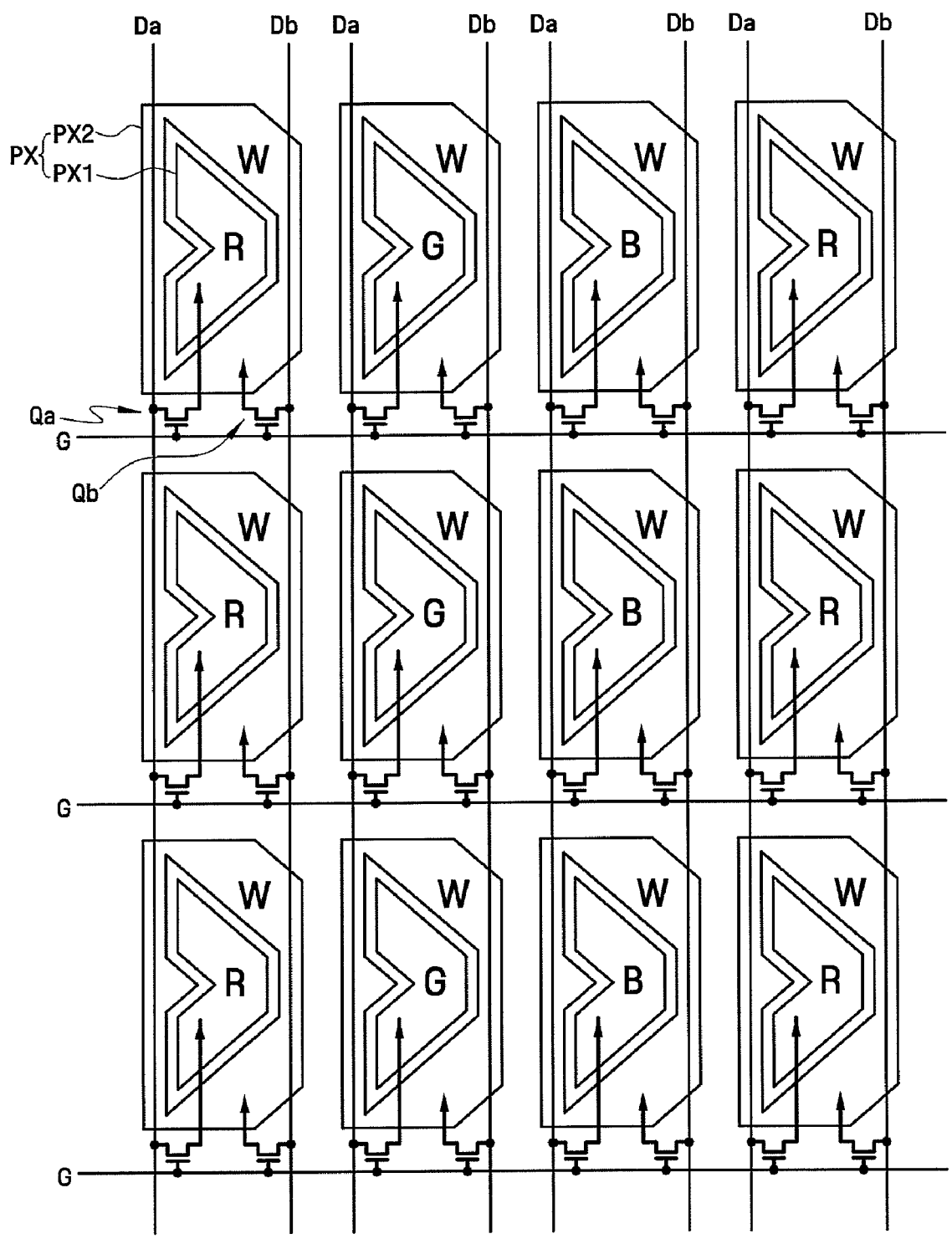
FIG. 1A is a schematic layout view of a pixel arrangement of a liquid crystal display according to an exemplary embodiment of the present invention.

Hereinafter, exemplary embodiments of the present invention will be described in detail with reference to the accompanying drawings. However, the present invention is not limited to the embodiments disclosed hereinafter, but can be implemented in diverse forms. The term "on," as used herein, may include either the case where an element or layer is located directly on another element or layer or the case where intervening elements or layers are present. The same drawing reference numerals may be used for the same elements across various figures.

Hereinafter, a pixel arrangement of a liquid crystal display (LCD) according to an exemplary embodiment of the present invention will be described with reference to FIGS. 1A to 1C. FIG. 1A is a schematic layout view of a pixel arrangement of a liquid crystal display according to an exemplary embodiment of the present invention, FIG. 1B is a schematic layout view of a pixel arrangement of a liquid crystal display according to an exemplary embodiment of the present invention, and FIG. 1C is a schematic layout view of a pixel arrangement of a liquid crystal display according to an exemplary embodiment of the present invention.

The liquid crystal display, as illustrated in FIG. 1A, includes a first substrate (See 100 in FIG. 5) and a second substrate (See 200 in FIG. 5) arranged opposite to each other, and a liquid crystal layer (See 300 in FIG. 5) interposed between the first substrate 100 and the second substrate 200. The first substrate 100 includes a plurality of gate lines and a plurality of data lines arranged crossing each other, and a plurality of pixels PX arranged in the form of a matrix in regions between the gate lines and the data lines.

Figure 1B:
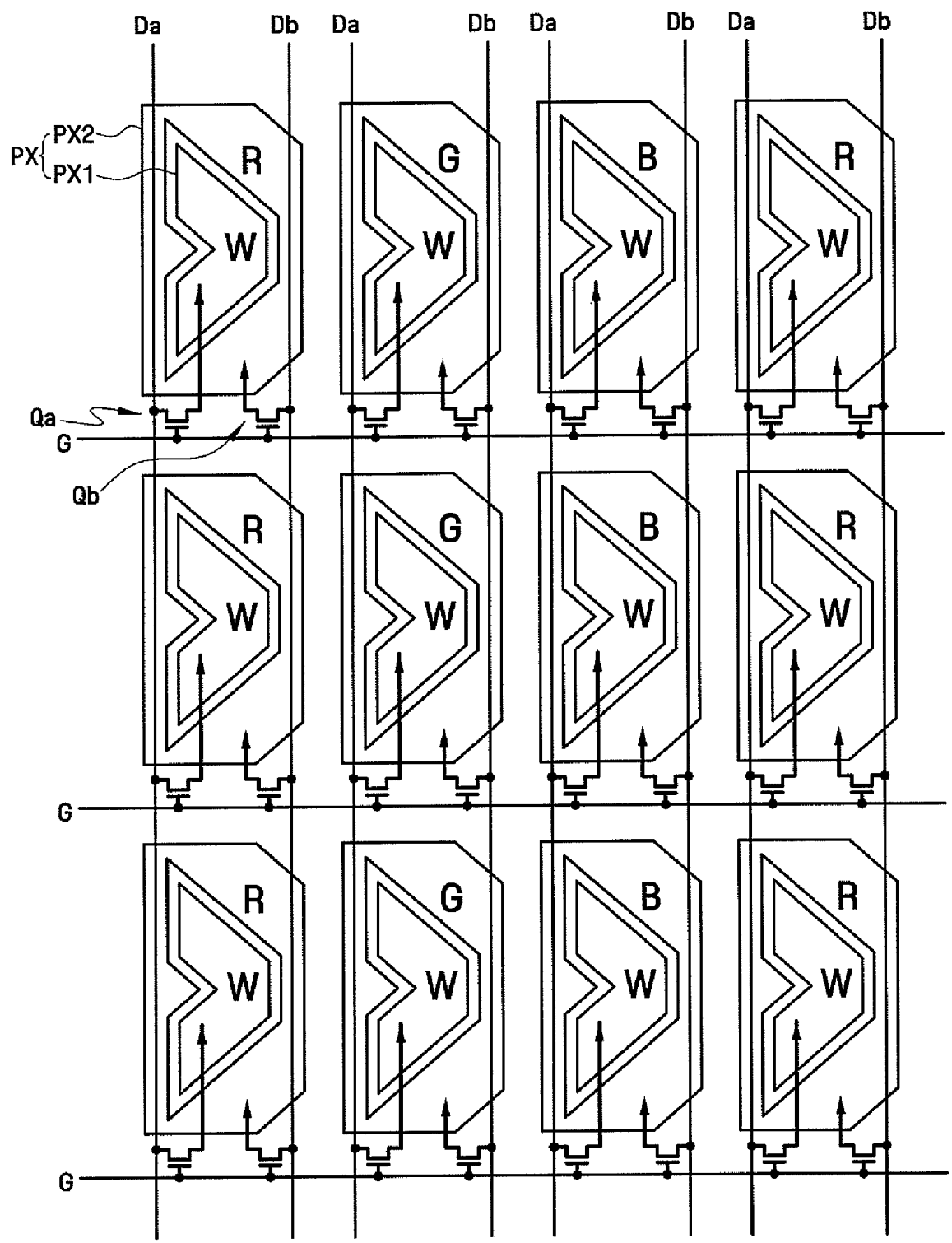
FIG. 1B is a schematic layout view of a pixel arrangement of a liquid crystal display according to an exemplary embodiment of the present invention.
Figure 1C:
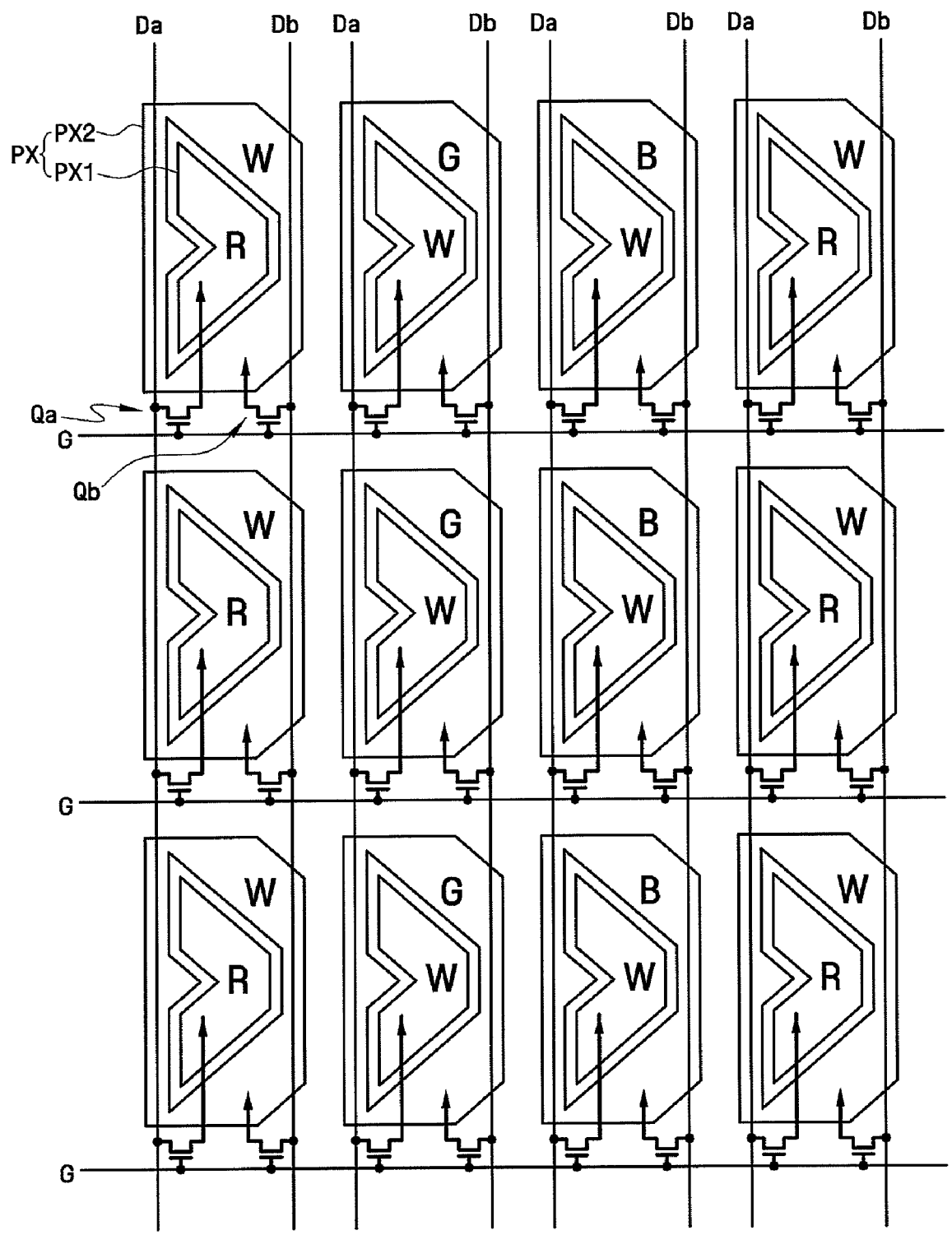
FIG. 1C is a schematic layout view of a pixel arrangement of a liquid crystal display according to an exemplary embodiment of the present invention.

Referring to FIGS. 1A to 1C, the first substrate includes a plurality of gate lines G for transferring a gate signal, and a plurality of data lines Da and Db for transferring data signals. The gate lines G may extend, for example, in a first direction corresponding to a horizontal direction and are arranged in parallel with one another. The data lines Da and Db may extend, for example, in a second direction corresponding to a vertical direction and are arranged in parallel with one another. The gate lines G and the data lines Da and Db cross each other, and are arranged, for example, in the form of a lattice. However, the gate lines G and the data lines Da and Db are not limited to straight lines arranged in parallel with one another, but may be in a bent form in a specified direction where desired.

Each pixel PX includes a first sub-pixel PX1 and a second sub-pixel PX2, which include switching elements Qa and Qb connected to two data lines Da and Db and one gate line G, respectively. For example, the first sub-pixel PX1 and the second sub-pixel PX2 are allocated with two data lines Da and Db and one gate line G. The switching elements of the first sub-pixel PX1 and the second sub-pixel PX2 may be implemented by thin film transistors provided in the first substrate. The first switching element Qa and the second switching element Qb are independently driven to control the first sub-pixel PX1 and the second sub-pixel PX2, respectively.

In the pixel PX, the first sub-pixel PX1 corresponds to a region for displaying colors, and the second sub-pixel PX2 corresponds to a region for adjusting contrast that adjusts luminance of the liquid crystal display by providing white light. The first sub-pixel PX1 and the second sub-pixel PX2 are connected to the first switching element Qa and the second switching element Qb, respectively, and are independently driven. For example, when the display luminance is adjusted in accordance with external brightness, the brightness difference between the sub-pixels of the liquid crystal display can be adjusted. Also, by dividing a pixel into a color region and a contrast region, the luminance ratio can be separately adjusted for each color region.

For example, a pixel includes both a first sub-pixel PX1 for displaying colors and a second sub-pixel PX2 for adjusting contrast. Domains of the first sub-pixel PX1 and the second sub-pixel PX2 are each divided by a domain dividing means, and accordingly, wide viewing angles for the colors and the luminance can be provided in all four directions.

A pixel PX is divided into two parts, and one part is used as a region for representing the colors, while the other part is used as a region for representing the contrast. Accordingly, a unit pixel is formed of a red pixel, a green pixel, and a blue pixel, each colored pixel includes a region for adjusting the contrast. For example, the colors of the pixels arranged along the gate line G and the data lines Da and Db form successively repeated structures of red, green, and blue, and thus odd-numbered pixels are successively arranged. Accordingly, voltages having the same polarity are applied to adjacent pixels having the same color in a dot inversion structure in which the pixels are alternately inversion-driven, and thus the occurrence of crosstalk among the pixels can be prevented. The details of the inversion drive of the liquid crystal display according to an exemplary embodiment of the present invention are described below.

The first sub-pixel PX1 may be surrounded by the second sub-pixel PX2. This structure may be modified into diverse forms in consideration of the domain division and aperture ratio of the LCD. The area ratio of the first sub-pixel PX1 to the second sub-pixel PX2 may be set in the range of 1:0.5 to 1:2.

However, the shapes of the first sub-pixel PX1 and the second sub-pixel are not limited thereto. For example, as illustrated in FIG. 1B, the first sub-pixel PX1 may be used as a region for adjusting the contrast by providing white light, and the second sub-pixel PX2 may be used as a region for adjusting the colors. Although not illustrated in FIGS. 1A and 1B, by properly mixing the shape of the pixel of FIG. 1A and the shape of the pixel of FIG. 1B, an arrangement in which the pixel of FIG. 1A and the pixel of FIG. 1B are alternately arranged may be formed.

On the other hand, the first sub-pixel PX1 and the second sub-pixel PX2 may change function with each other in accordance with the color of the pixel. For example, as illustrated in FIG. 1C, the first sub-pixel PX1 may form a sub-pixel region for representing a red color and the second sub-pixel PX2 may form a contrast adjustment region for adjusting the white color, while the first sub-pixel PX1 of an adjacent pixel PX forms a contrast adjustment region for adjusting the white color and the second sub-pixel PX2 thereof forms a sub-pixel region for representing a green or blue color. Where desired, the sub-pixel region for representing the color and the sub-pixel region for representing the contrast by the white color having different luminance may change function with each other, and thus the expression range of the color and contrast can be widened.

FIG. 1C shows the first sub-pixel PX1 and the second sub-pixel PX2 used as the red sub-pixel region and the white sub-pixel region, respectively. The respective sub-pixels may change functions with each other to form the color representing region and the contrast representing region, respectively. However, this is merely exemplary, and the sub-pixel region representing the white color and the sub-pixel region representing another color may change functions with each other.

Figure 2:
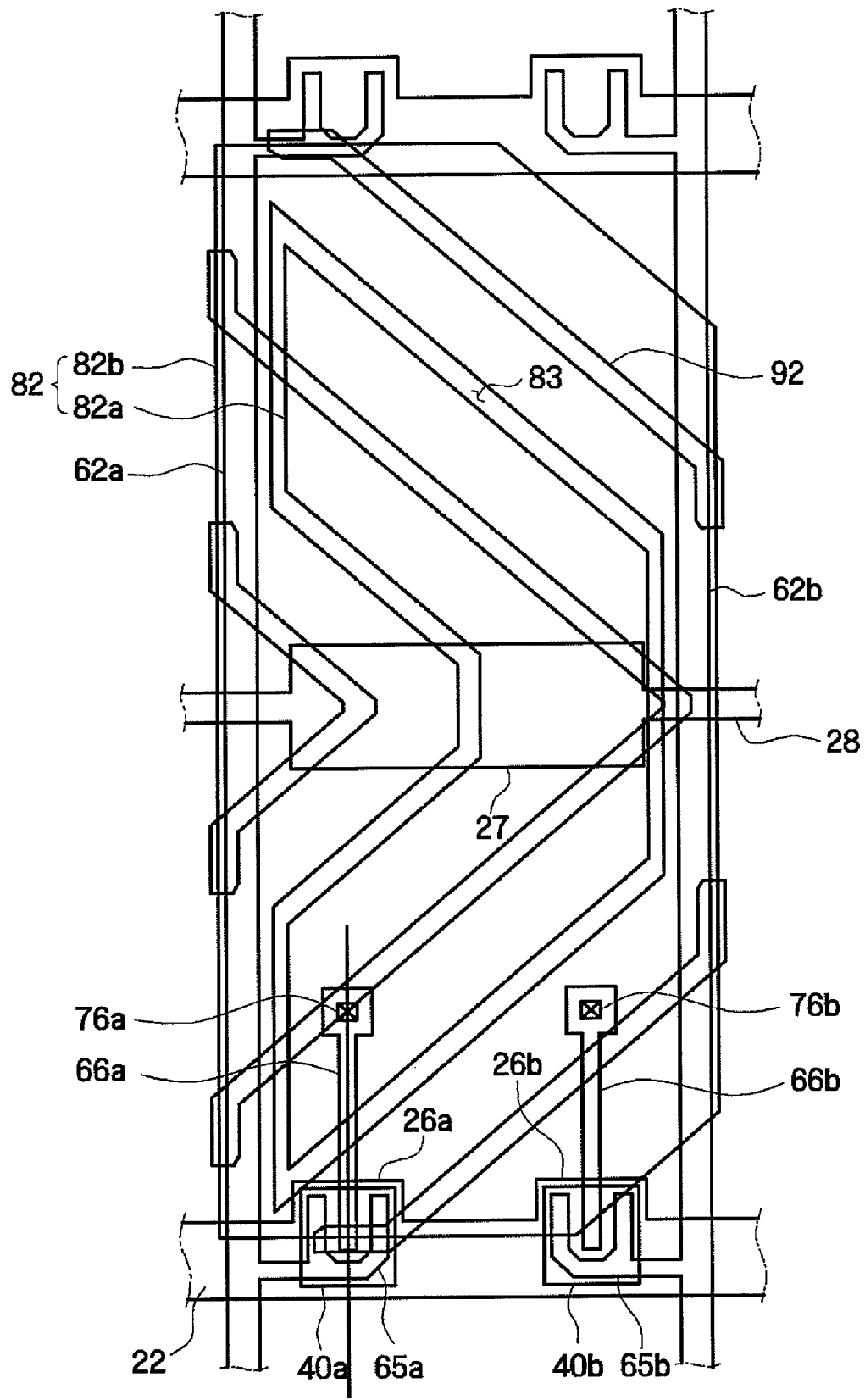
FIG. 2 is a layout view of a pixel of a liquid crystal display of FIG. 1A.
Figure 3:
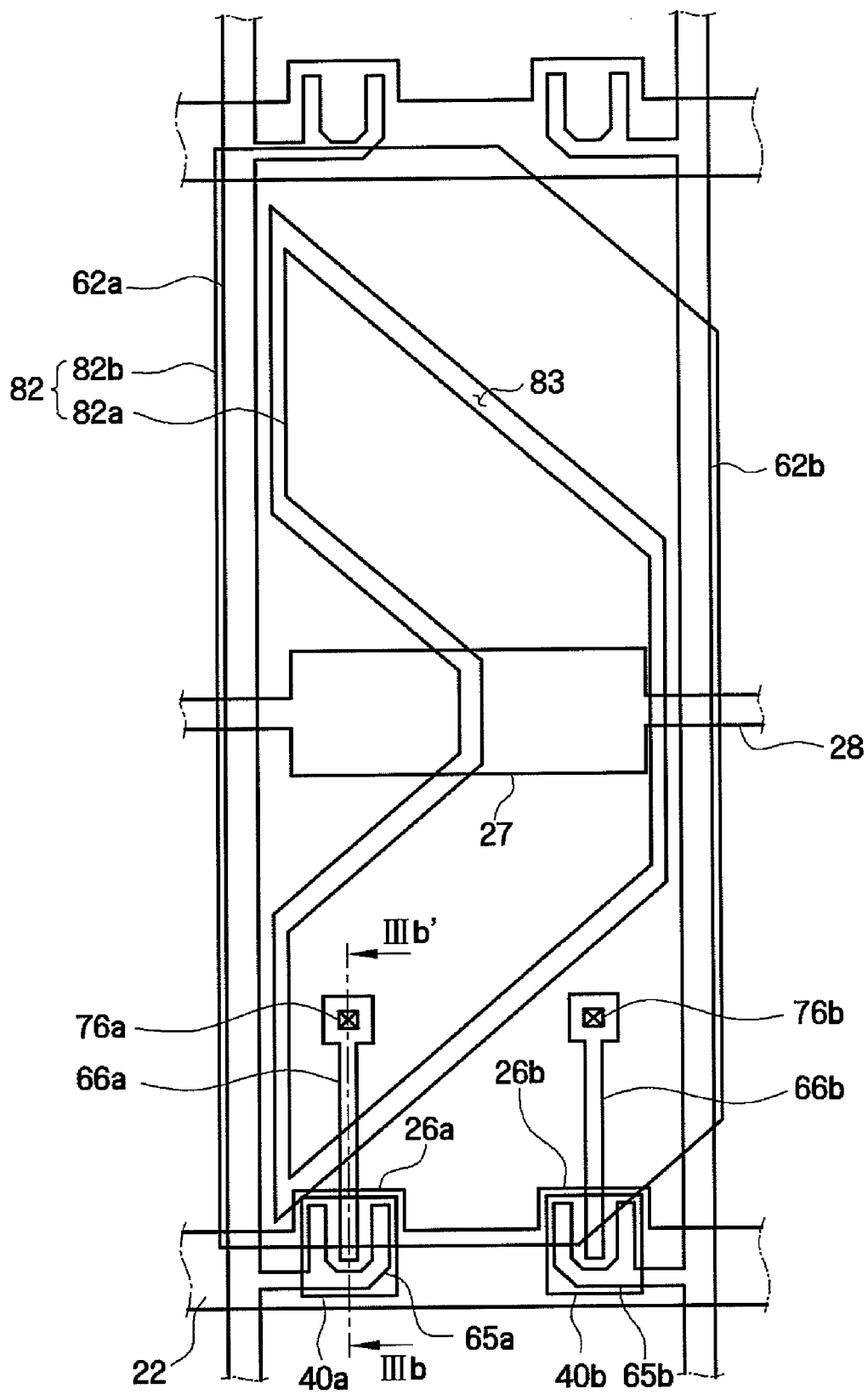
FIG. 3 is a layout view of a first substrate included in the liquid crystal display of FIG. 2.
Figure 4:
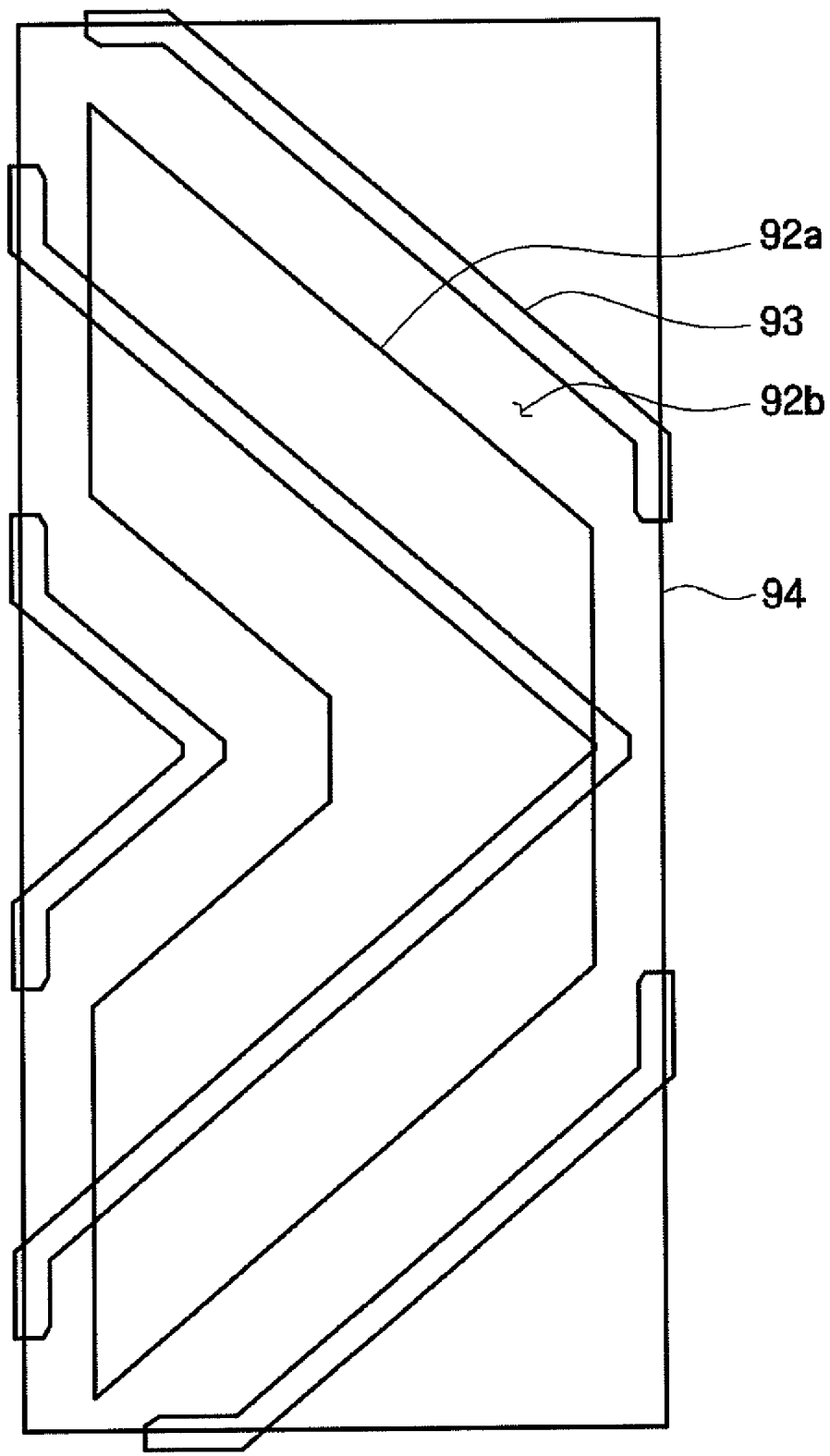
FIG. 4 is a layout view of a second substrate included in the liquid crystal display of FIG. 2.
Figure 5:
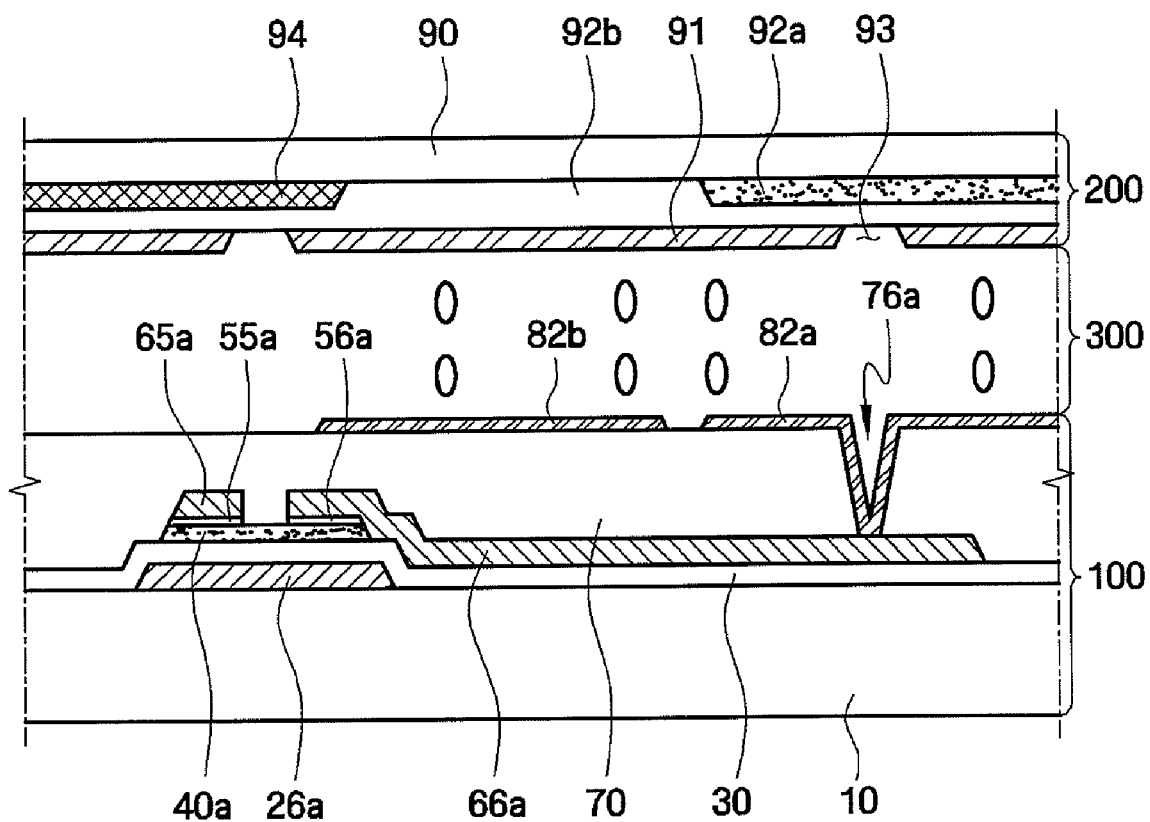
FIG. 5 is a sectional view of the liquid crystal display of FIG. 2, taken along line V-V' of FIG. 2.

With reference to FIGS. 2 to 5, the liquid crystal display according to an exemplary embodiment of the present invention will be described in detail. Here, FIG. 2 is a layout view of a pixel of a liquid crystal display of FIG. 1A. FIG. 3 is a layout view of a first substrate included in the liquid crystal display of FIG. 2. FIG. 4 is a layout view of a second substrate included in the liquid crystal display of FIG. 2. FIG. 5 is a sectional view of the liquid crystal display of FIG. 2, taken along line V-V' of FIG. 2.

A gate line 22 for transferring a gate signal extends, for example, in a first direction corresponding to a horizontal direction. The gate line 22 is formed on a first insulating substrate 10 made of transparent glass or a material with similar properties. The gate line 22 is allocated to each pixel, and on the gate line 22, a pair of first and second gate electrodes 26a and 26b are formed. The gate electrodes 26a and 26b may widen and project away from the substrate 10. The gate line 22, and the first and second gate electrodes 26a and 26b form gate wires.

In addition, on the first insulating substrate 10, a storage line 28, which crosses the pixel region and extends in a first direction that is substantially in parallel with the gate line 22, is formed. A storage electrode 27 having a large width is formed to connect with the storage line 28. The storage electrode 27 overlaps a pixel electrode 82, and forms a storage capacitor that increases the charge conservation capability of a pixel. The storage electrode 27 and the storage line 28 form storage wires. In an exemplary embodiment of the present invention, the storage wires 27 and 28 overlap the center of the pixel region. However, the present invention is not limited thereto, the shape and arrangement of the storage wires 27 and 28 may be modified in various forms. Further, if the storage capacitance generated due to the overlap between the pixel electrode 82 and the gate line 22 is sufficient, the storage wires 27 and 28 need not be formed.

The gate wires 22, 26a, and 26b and the storage wires 27 and 28 may be made of an aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), titanium (Ti), tantalum (Ta), and the like. Also, the gate wires 22, 26a, and 26b and the storage wires 27 and 28 may have a multilayer structure including two conductive layers (not illustrated) having different physical properties. One of the two conductive layers may be made of metal with low resistivity, such as aluminum-based metal, silver-based metal, copper-based metal, and the like. Accordingly, a signal delay or a voltage drop of the gate wires 22, 26a, and 26b and the storage wires 27 and 28 may be reduced. The other of the two conductive layers may be made of a material having superior contact characteristics with indium tin oxide (ITO) and indium zinc oxide (IZO), such as molybdenum-based metal, chromium, titanium, tantalum, and the like. Examples of the multilayer structure include a combination of a lower chromium layer and an upper aluminum layer and a combination of a lower aluminum layer and an upper molybdenum layer. However, the present invention is not limited thereto, and the gate wires 22, 26a, and 26b and the storage wires 27 and 28 may be made of various kinds of metal and conductors.

On the gate line 22 and the storage wires 27 and 28, a gate insulating film 30, which is made of silicon nitride (SiNx) or a material with similar properties, is disposed.

On the gate insulating layer 30, a pair of semiconductor layers 40a and 40b, which are made of hydrogenated amorphous silicon or polycrystalline silicon, is disposed. The semiconductor layers 40a and 40b may have various shapes, such as an island shape, a stripe shape, and the like. According to an exemplary embodiment of the present invention, the semiconductor layers 40a and 40b have island shapes.

On the semiconductor layers 40a and 40b, ohmic contact layers 55a and 56a, which are made of silicide or n+ hydrogenated amorphous silicon doped with high-density n-type impurities, are respectively disposed. The ohmic contact layers 55a and 56a make a pair and are disposed on the semiconductor layers 40a and 40b.

On the ohmic contact layers 55a and 56a and the gate insulating layer 30, a pair of first and second data lines 62a and 62b and a pair of drain electrodes 66a and 66b, which correspond to the first and second data lines 62a and 62b, respectively, are disposed.

The first and second data lines 62a and 62b extend mainly in a vertical direction, and cross the gate line 22 and the storage line 28 to transfer a data voltage. On the first and second data lines 62a and 62b, first and second source electrodes 65a and 65b extend toward the first and second drain electrodes 66a and 66b. As illustrated in FIG. 2, one pixel is divided into a pair of sub-pixels, and the first data line 62a transfers a data signal to one sub-pixel, while the second data line transfers a separate data signal to the other sub-pixel.

The first and second data lines 62a and 62b, the first and second source electrodes 65a and 65b, and the first and second drain electrodes 66a and 66b form data wires.

The data wires 62a, 62b, 65a, 65b, 66a, and 66b may be made of chromium, molybdenum-based metal, and refractory metal such as tantalum, titanium, and the like. The data wires 62a, 62b, 65a, 65b, 66a, and 66b may have a multilayer structure that includes a lower layer (not illustrated) made of refractory metal or a material with similar properties, and an upper layer (not illustrated) made of a material with low resistivity. Examples of the multilayer structure include a combination of a lower chromium layer and an upper aluminum layer and a combination of a lower aluminum layer and an upper molybdenum layer. Also, the multilayer structure may be a triple-layer structure that includes molybdenum-aluminum-molybdenum layers.

The first and second source electrodes 65a and 65b at least partially overlap the semiconductor layers 40a and 40b, respectively. The first and second drain electrodes 66a and 66b are opposite to the first and second source electrodes 65a and 65b, respectively. The first and second drain electrodes 66a and 66b are centered around the respective gate electrodes 26a and 26b, and at least partially overlap the semiconductor layers 40a and 40b, respectively. Here, the ohmic contact layers 55a and 56a are disposed among the semiconductor layers 40a and 40b, the first and second source electrodes 65a and 65b, and the first and second drain electrodes 66a and 66b to reduce the contact resistance.

A passivation layer 70 is formed on the data wires 62a, 62b, 65a, 65b, 66a, and 66b and exposed portions of the semiconductor layers 40a and 40b. The passivation layer 70 may be made of an inorganic material, such as silicon nitride or silicon oxide, an organic material having the photosensitivity and superior smoothing characteristics, or a low dielectric material, such as a-Si:C:O and a-Si:O:F, formed by plasma enhanced chemical vapor deposition (PECVD). Also, the passivation layer 70 may have a double-layer structure that includes a lower inorganic layer and an upper organic layer that protect the exposed portions of the semiconductor layers 40a and 40b, while taking advantage of the superior characteristics of an organic layer. Further, the passivation layer 70 may be a red, green, or blue color filter layer.

The passivation layer 70 is electrically connected to the first and second drain electrodes 66a and 66b through first and second contact holes 76a and 76b, respectively. The first and second sub-pixel electrodes 82a and 82b, which are located in the pixel region, are disposed on the passivation layer 70. Here, the first and second pixel electrodes 82a and 82b are made of a transparent conductive material, such as ITO (Indium Tin Oxide) or IZO (Indium Zinc Oxide), or a reflective conductive material such as aluminum.

The first and second sub-pixel electrodes 82a and 82b are physically and electrically connected to the first and second drain electrodes 66a and 66b through the first and second contact holes 76a and 76b, and receive different data voltages from the first and second drain electrodes 66a and 66b.

The first and second sub-pixel electrodes 82a and 82b, which receive the data voltages, generate an electric field along with a common electrode of the upper substrate, and thus the arrangement of liquid crystal molecules between the first and second sub-pixel electrodes 82a and 82b and the common electrode is determined.

Also, the sub-pixel electrodes 82a and 82b and the common electrode form liquid crystal capacitors Clca and Clcb, and maintain the applied voltages even after the thin film transistors Qa and Qb are turned off. Storage capacitors Csta and Cstb, which are connected in parallel with the liquid crystal capacitors Clca and Clcb, are formed through overlapping of the first and second sub-pixel electrodes 82a and 82b or the first and second drain electrodes 66a and 66b connected thereto and the storage wires 27 and 28. The storage capacitors Csta and Cstb, so arranged, have strong voltage maintenance capabilities.

One pixel electrode 82 includes first and second sub-pixel electrodes 82a and 82b which are engaged with each other at a specified gap 83 and are electrically separated from each other. The first sub-pixel electrode 82a has an approximate "V" shape that is laid flat, and the second sub-pixel electrode 82b is formed in a region excluding the first sub-pixel electrode 82a in the pixel. For example, the first sub-pixel electrode 82a is surrounded by the second sub-pixel electrode 82b.

The gap 83 includes a slanting part that is at an angle of about 45° or about −45° to the gate line 22 and a vertical part arranged along the first and second data lines 62a and 62b to connect between the slanting parts.

Although not illustrated, a domain forming means, for example, a cutout or a protrusion, may be formed on the first sub-pixel electrode 82a and the second sub-pixel electrode 82b at an angle of about 45° or −45° to the gate line 22. The display region of the pixel electrode 82 is divided into a plurality of domains in accordance with a direction in which main directors of the liquid crystal molecules included in the liquid crystal layer are arranged when an electric field is applied thereto. The gap 83 and the domain dividing means divide the pixel electrode 82 into a large number of domains. Here, the term "domain" means a region that includes liquid crystal molecules of which the directors are slanted in group toward a specified direction by the electric field formed between the pixel electrode 82 and the common electrode 91.

As described above, the first sub-pixel electrode 82 has an approximate "V" shape, and is surrounded by the second sub-pixel electrode 82b. For example, the second sub-pixel electrode 82b includes a main region which is adjacent to the slanting part of the gap 83 and a bridge region. The main region is generally at an angle of about 45° or about −45° to the gate line 22 and controls the movement of the liquid crystal molecules. The bridge region is adjacent to the vertical part of the gap 83 and is arranged along the first and second data lines 62a and 62b. The bridge region connects the main regions.

The first and second data lines 62a and 62b at least partly overlap the second sub-pixel electrode 82b. For example, the first and second data lines 62a and 62b completely overlap the second sub-pixel electrode 82b in a width direction. For example, the first and second data lines 62a and 62b overlap the bridge region of the second sub-pixel electrode 82b.

On the first and second sub-pixel electrodes 82a and 82b and the passivation layer 70, an alignment layer (not illustrated) for aligning the liquid crystal layer may be formed.

The second substrate is described below with reference to FIGS. 2, 4, and 5.

On the second insulating substrate 90 made of transparent glass, a black matrix 94 for preventing a light leak and defining the pixel region is formed. The black matrix 94 may be formed on a part corresponding to the gate line 22 and the first and second data lines 62a and 62b and a part corresponding to the thin film transistor. The black matrix 94 may have various shapes that may block the light leak in the neighborhood of the first and second sub-pixel electrodes 82a and 82b and the thin film transistor. The black matrix 94 may be made of metal (or metal oxide) such as chromium or chromium oxide, organic black resist, and the like.

On the pixel region between the black matrices 94, a color pattern 92a in which one of red, green, and blue colors is formed and a contrast pattern 92b for transmitting the white light are arranged. The color pattern 92a and the contrast pattern 92b are arranged in a pair for each pixel. Red, green, and blue colors may be successively formed in the color patterns 92a.

The color pattern 92a is formed in a part corresponding to the first sub-pixel electrode 82a of the first substrate 100. The color patterns 92a may be red, green, and blue color filters, which are successively formed for the respective pixels.

The region in which the first sub-pixel electrode 82a and the color pattern 92a overlap each other corresponds to the first sub-pixel PX1, and the region in which the second sub-pixel electrode 82b and the contrast pattern 92b overlap each other corresponds to the second sub-pixel PX2.

The light passed through the color pattern 92a is either red, green, or blue, and the luminance of the light is adjusted in accordance with the voltage being applied to the first sub-pixel electrode 82a. The color pattern 92a may be formed as a colored organic layer of red, green, and blue. The light passed through the contrast pattern 92b is white light, and the luminance of the light is adjusted in accordance with the voltage being applied to the second sub-pixel electrode 82b. The contrast pattern 92b may be formed as a transparent organic layer or a light passing region, in which no separate organic layer is formed and from which the color organic layer is removed.

The above-described color pattern 92a and the contrast pattern 92b correspond to the liquid crystal display as illustrated in FIG. 1A. For example, the locations of the color pattern and the contrast pattern of the liquid crystal display as illustrated in FIG. 1B may be reversed to form the color pattern and the contrast pattern as illustrated in FIG. 1A, and the positions of the color pattern and the contrast pattern of the liquid crystal display as illustrated in FIG. 1C may be changed with respect to at least one color. In addition, the positions of the color pattern and the contrast pattern may be changed.

On the color pattern 92a and the contrast pattern 92b, an overcoat layer (not illustrated) for smoothing the unevenness of the patterns may be formed.

On the overcoat layer, a common electrode 91 made of a transparent conductive material such as ITO or IZO is formed. The common electrode 91 is opposite to the first and second sub-pixel electrodes 82a and 82b, and includes a domain dividing means 93, for example, a cutout or a projection, that is at an angle of about 45° or −45° to the gate line 22.

An alignment layer (not illustrated) for aligning the liquid crystal molecules may be formed on the common electrode 91.

The basic structure of the liquid crystal display according to an exemplary embodiment of the present invention is formed by arranging and combining the first substrate 100 and the second substrate 200, injecting a liquid crystal material between the first and second substrates, and then performing a vertical alignment of the injected liquid crystal material.

The liquid crystal molecules included in the liquid crystal layer are aligned so that their directors are perpendicular to the first and second substrates when no electric field is applied between the pixel electrode 82 and the common electrode 91. In this case, the liquid crystal molecules have negative dielectric anisotropy.

The liquid crystal display is formed by arranging elements, such as polarizers, a backlight, and the like, on the basic structure. The polarizers are disposed on both sides of the basic structure, and one of the transmission axes of the polarizers is arranged in parallel to the gate line 22, while the other thereof is arranged perpendicular to the gate line 22.

If an electric field is applied between the first substrate 100 and the second substrate 200, an electric field perpendicular to the two substrates is formed in most regions, but a horizontal electric field is formed in the neighborhood of the gap 83 of the pixel electrode 82 and the domain dividing means 93 of the common electrode 91. This horizontal electric field helps the liquid crystal molecules of the respective domains to align.

Since the liquid crystal molecules have the negative dielectric anisotropy, the liquid crystal molecules in the respective domains are slanted in a direction perpendicular to the gap 83 or the domain dividing means 93 for dividing the domains when an electric field is applied to the liquid crystal molecules. The liquid crystal molecules at both sides of the gap 83 or the domain dividing means 93 and the lower domain dividing means 83 are slanted in opposite directions to each other. The slanting parts of the gap 83 or the domain dividing means 93 are symmetrically formed around the center of the pixel. The liquid crystal molecules are substantially at an angle of 45° or −45° to the gate line 22, and are slanted in four directions. Accordingly, the optical characteristics are compensated for by the liquid crystal molecules slanted in four directions, and thus the viewing angle is widened.

Figure 6A:
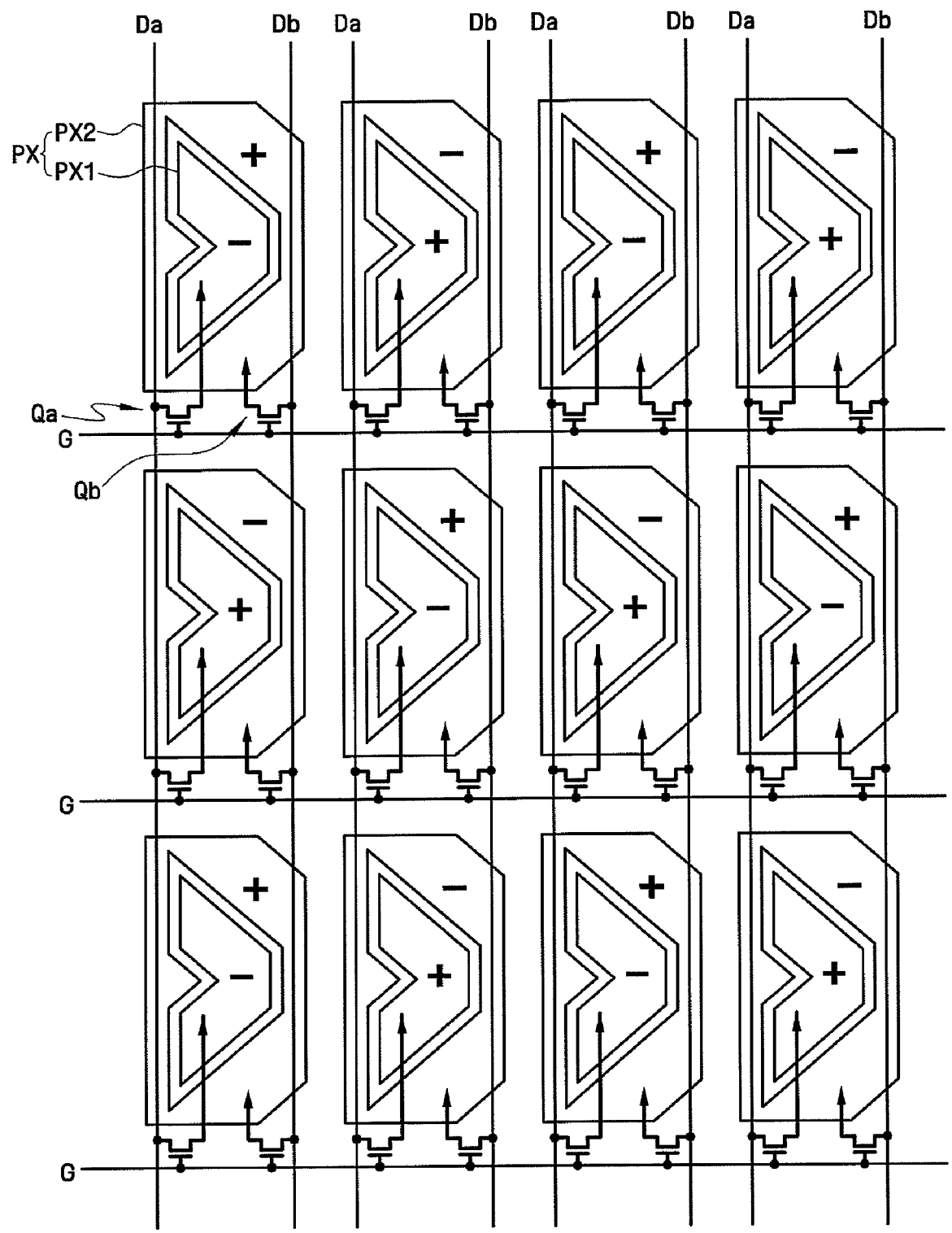
FIGS. 6A and 6B are schematic layout views explaining a first driving method of the liquid crystal display of FIG. 1A.
Figure 6B:
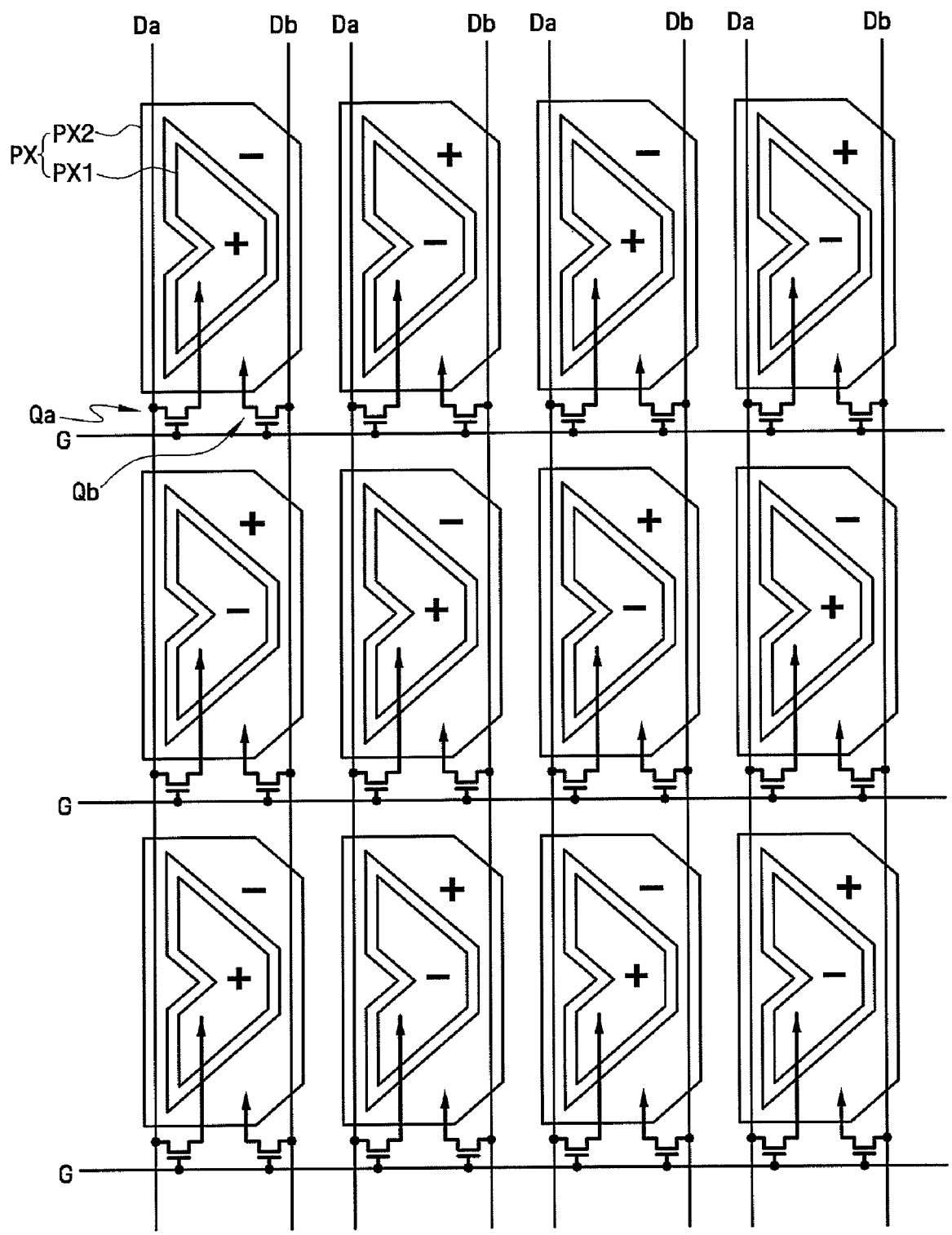

With reference to FIGS. 6A and 6B, a driving method will be described, in which positive and/or negative data voltages are applied to the first and second sub-pixels through a pair of data lines, and voltages having polarities different from those of the previous sub-pixels are applied to the first and second sub-pixels of an adjacent pixel along the gate lines or data lines. For convenience in explanation, the above-described driving method is called a dot inversion driving method, and the arrangement of the sub-pixels. FIGS. 6A and 6B are schematic layout views explaining a first driving method of the liquid crystal display of FIG. 1A.

As used herein, "positive voltage" means a voltage higher than the common voltage applied to the common electrode, and "negative voltage" means a voltage lower than the common voltage.

FIG. 6A shows polarities of data voltages being applied to pixels of a first frame.

A negative (−) data voltage is applied to the first sub-pixel PX1 of the first pixel PX, and a positive (+) data voltage is applied to the second sub-pixel PX2. A positive (+) data voltage is applied to the first sub-pixel PX1 of an adjacent pixel along the gate lines or the data lines, and a negative (−) data voltage is applied to the second sub-pixel PX2 thereof. For example, the positive (+) data voltage and the negative (−) data voltage are alternately applied to the first sub-pixel PX1 and the second sub-pixel PX2 formed along the gate lines and the data lines.

FIG. 6B shows polarities of data voltages applied to pixels of a second frame.

Unlike the first frame, a positive (+) data voltage is applied to the first sub-pixel PX1 of the first pixel PX, and a negative (−) data voltage is applied to the second sub-pixel PX2. A negative (−) data voltage is applied to the first sub-pixel PX1 of an adjacent pixel along the gate lines or the data lines, and a positive (+) data voltage is applied to the second sub-pixel PX2 thereof. For example, the positive (+) data voltage and the negative (−) data voltage are alternately applied to the first sub-pixel PX1 and the second sub-pixel PX2 formed along the gate lines and the data lines.

Comparing FIGS. 6A and 6B with each other, the voltages applied to the first frame and the voltages applied to the second frame are opposite to each other. For example, since voltages are inverted in a pixel unit for each frame, the data voltage having the polarity opposite to that of the data voltage of the previous frame is applied to the next frame. This driving method is called a dot inversion driving method. According to this dot inversion driving method, the polarities of the first sub-pixel PX1 and the second sub-pixel PX2 are changed at each frame, and thus the crosstalk phenomenon is prevented.

Figure 7A:
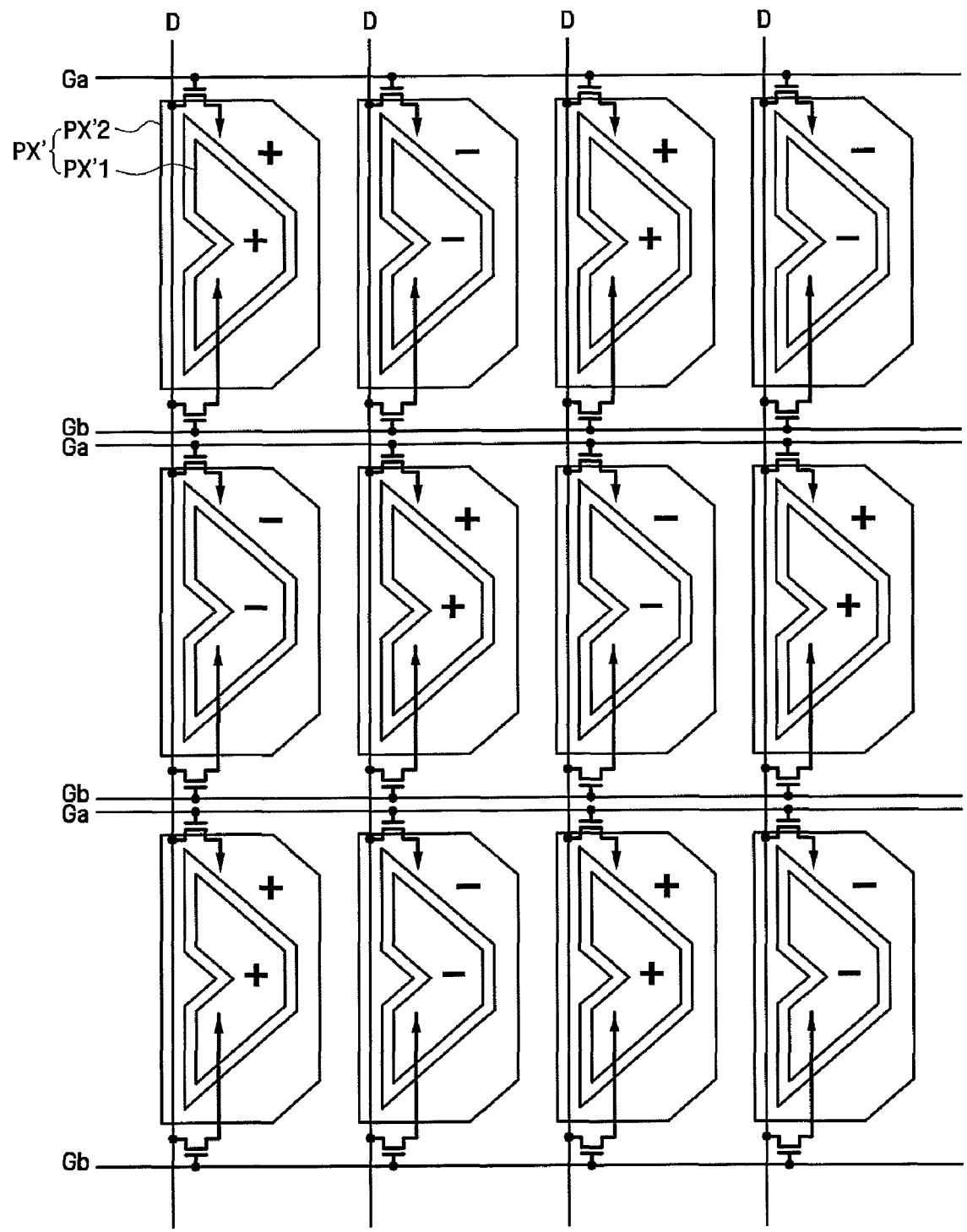
FIGS. 7A and 7B are schematic layout views explaining an example of a driving method.
Figure 7B:
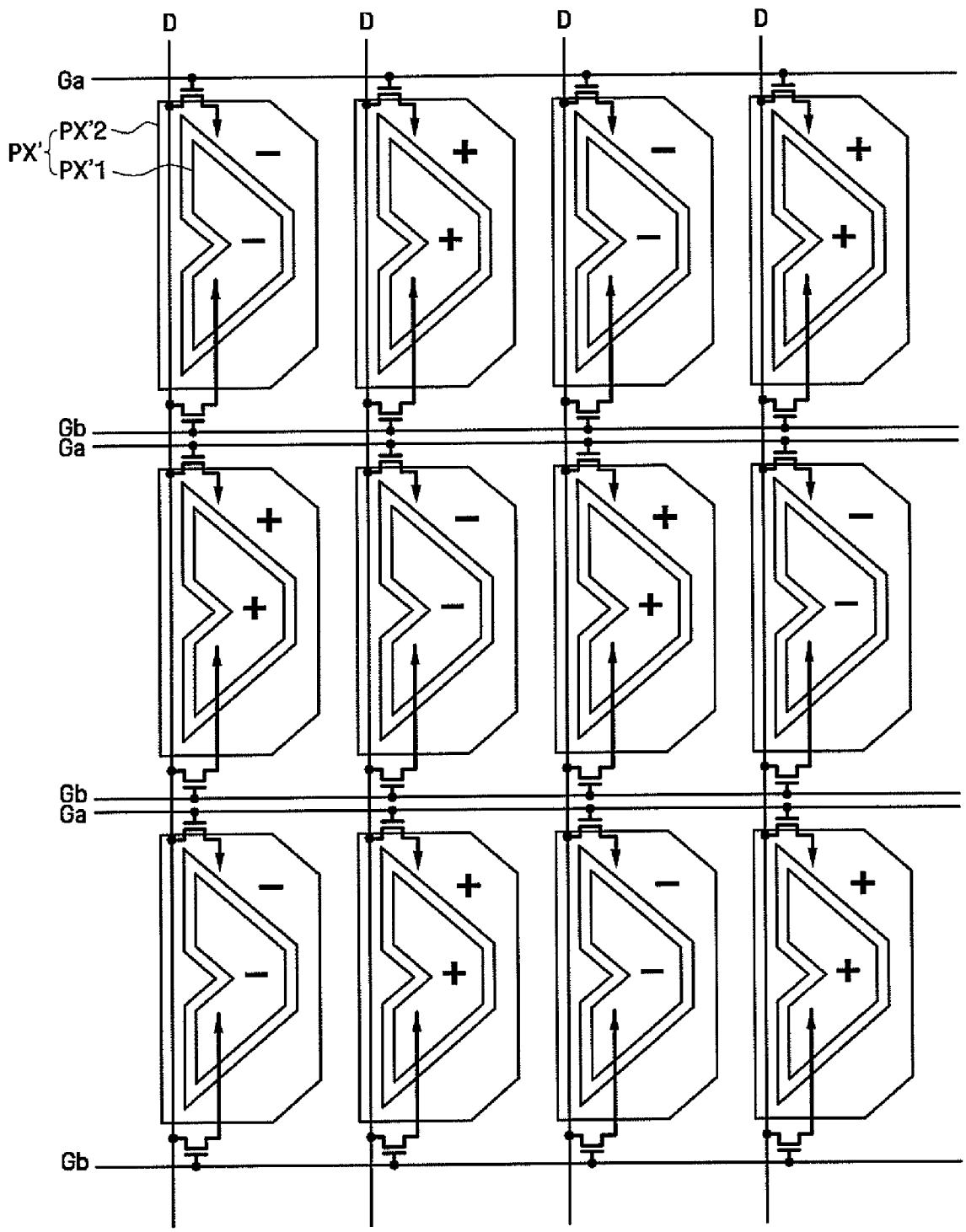

FIGS. 7A and 7B are schematic layout views explaining a driving method according to an exemplary embodiment of the present invention.

Here, a pixel PX' is defined by two gate lines Ga and Gb and one data line D. One pixel includes a first sub-pixel and a second sub-pixel, and voltages having the same polarity are applied to the first sub-pixel and the second sub-pixel of the same pixel.

Referring to FIG. 7A, voltages having the same polarity are applied to the first sub-pixel PX'1 and the second sub-pixel PX'2 of each pixel in the first frame. For example, a positive (+) data voltage is applied to the first sub-pixel PX'1 of the first pixel PX', and a positive (+) data voltage is applied to the second sub-pixel PX'2. A negative (−) data voltage is applied to the first sub-pixel PX'1 of an adjacent pixel along the gate lines or the data lines, and a negative (−) data voltage is applied to the second sub-pixel PX'2 thereof. For example, the positive (+) data voltage and the negative (−) data voltage formed along the gate lines and the data lines are alternately applied to the pixel.

FIG. 7B shows polarities of data voltages being applied to the pixels of a second frame.

Unlike the first frame, the negative (−) data voltage is applied to the first sub-pixel PX'1 of the first pixel PX', and the negative (−) data voltage is applied to the second sub-pixel PX'2. The positive (+) data voltage is applied to the first sub-pixel PX'1 of the adjacent pixel along the gate lines or the data lines, and the positive (+) data voltage is applied to the second sub-pixel PX'2 thereof.

Comparing FIGS. 7A and 7B with each other, the voltages applied to the first frame and the voltages applied to the second frame have polarities opposite to each other. For example, the pixel including the first sub-pixel PX'1 and the second sub-pixel PX'2 acts as a unit dot to which data voltages having the same polarity are applied, and as the frame is changed, the inversion is performed in a pixel unit.

Figure 8A:
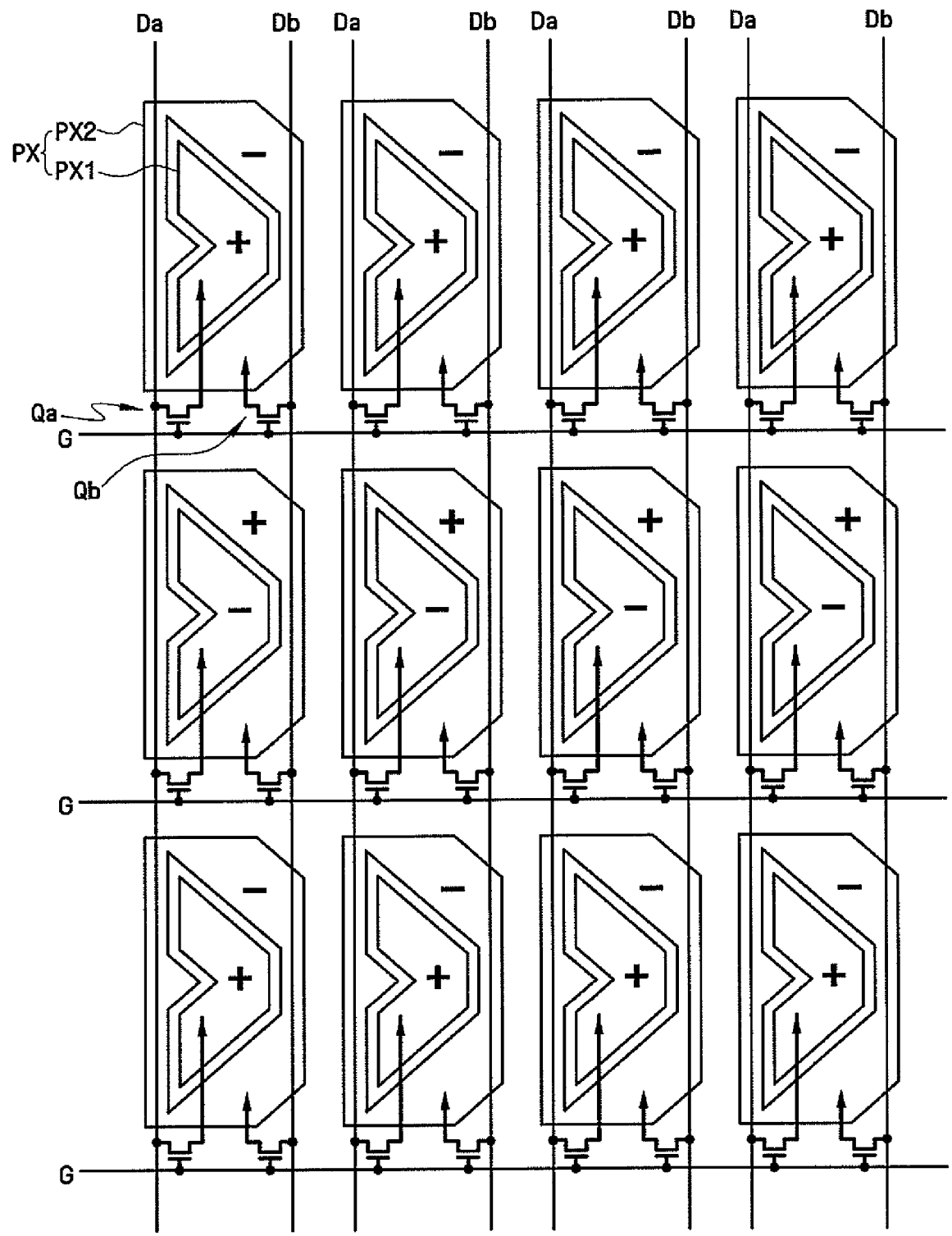
FIGS. 8A and 8B are schematic layout views explaining a driving method of the liquid crystal display of FIG. 1A.
Figure 8B:
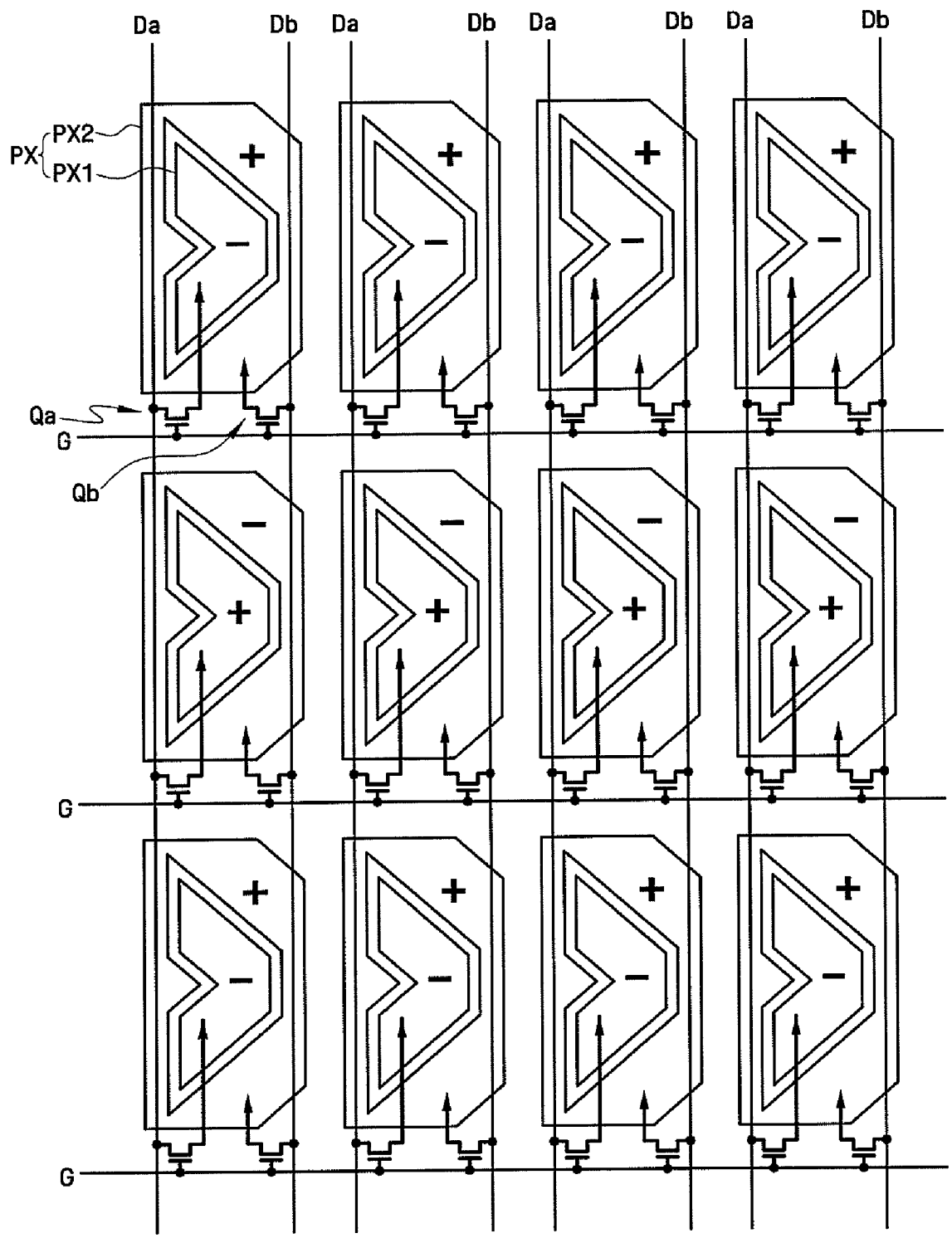

With reference to FIGS. 8A and 8B, a driving method will be described, in which data voltages having the same polarity are applied to respective pixels formed along the first gate line in a frame, and data voltages having the opposite polarity are applied to respective pixels formed along the second gate line in the next frame. For convenience in explanation, the above-described driving method is called a column inversion driving method. FIGS. 8A and 8B are schematic layout views explaining a driving method of the liquid crystal display of FIG. 1A according to an exemplary embodiment of the present invention.

FIG. 8A shows polarities of data voltages being applied to pixels of a first frame.

A positive (+) data voltage is applied to the first sub-pixel PX1 of a pixel formed along the first gate line G, and a negative (−) data voltage is applied to the second sub-pixel PX2. A negative (−) data voltage is applied to the first sub-pixel PX1 of a pixel formed along the second gate line, and a positive (+) data voltage is applied to the second sub-pixel PX2 thereof. For example, the data voltages having the same polarity are applied to the first sub-pixel PX1 and the second sub-pixel PX2 formed along the gate line G.

FIG. 8B shows polarities of data voltages applied to pixels of a second frame.

A negative (−) data voltage is applied to the first sub-pixel PX1 of a pixel formed along the first gate line G, and a positive (+) data voltage is applied to the second sub-pixel PX2. A positive (+) data voltage is applied to the first sub-pixel PX1 of a pixel formed along the second gate line, and a negative (−) data voltage is applied to the second sub-pixel PX2 thereof. For example, the data voltages having the same polarity are applied to the first sub-pixel PX1 and the second sub-pixel PX2 formed along the gate line G.

Comparing FIGS. 8A and 8B with each other, the voltages applied to the first frame and the voltages applied to the second frame are opposite to each other for each pixel line formed along the gate line. For example, since voltages are inverted in each pixel line formed along the gate line for each frame, the data voltages of the whole pixel line formed along the gate line in the next frame have the polarity opposite to that of the data voltages of the pixel line in the previous frame.

Figure 9A:
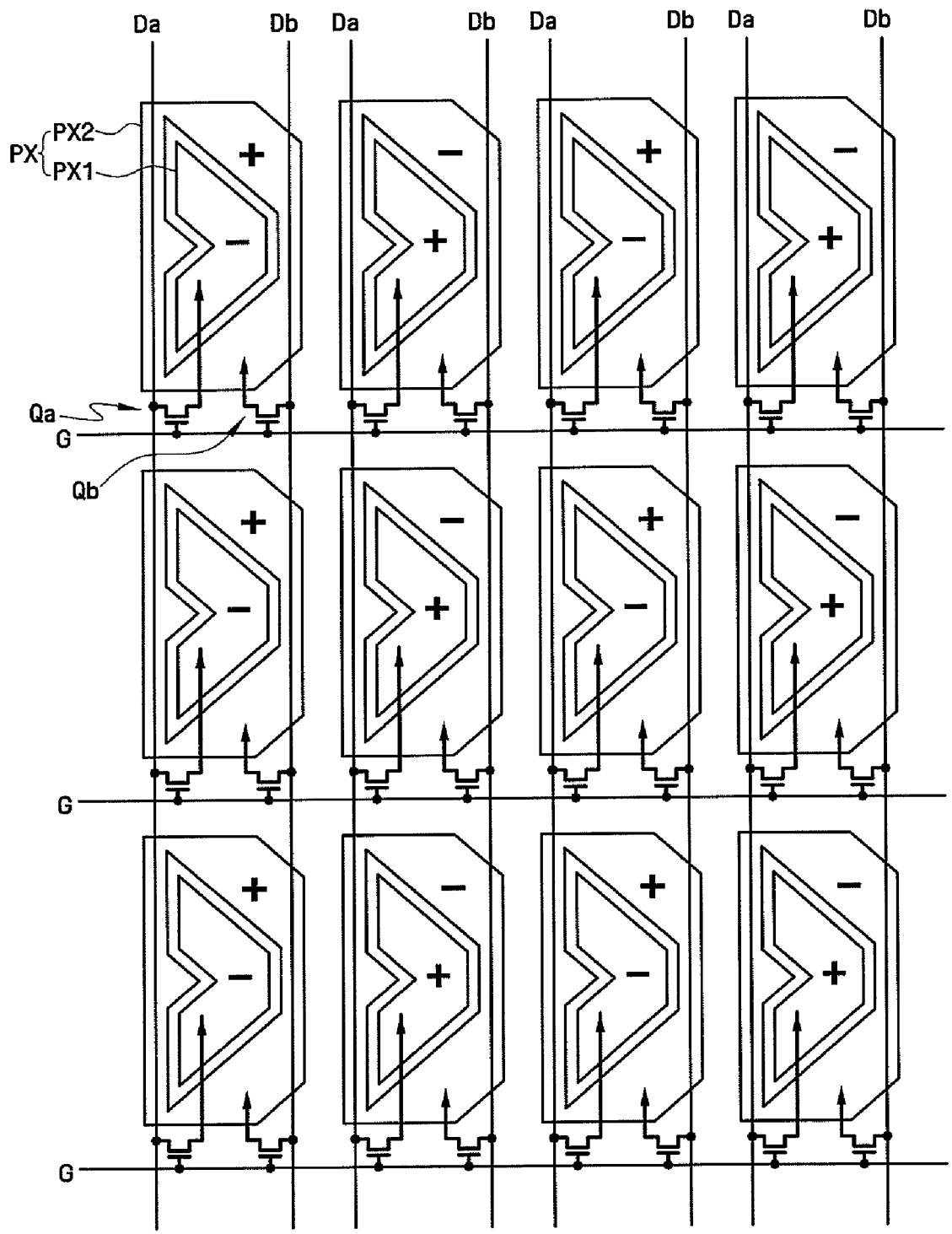
FIGS. 9A and 9B are schematic layout views explaining a driving method of the liquid crystal display of FIG. 1A.
Figure 9B:
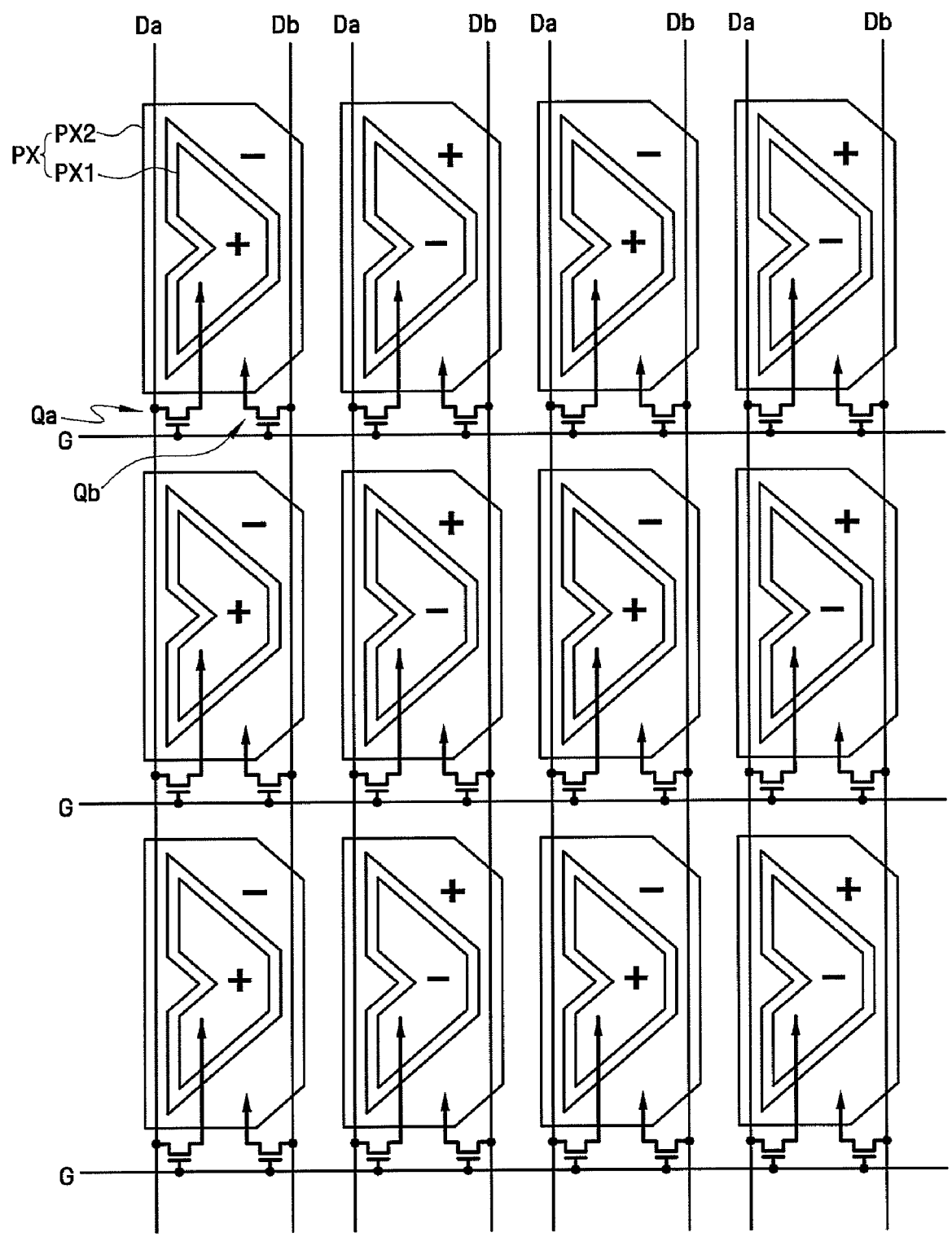

With reference to FIGS. 9A and 9B, a driving method will be described, in which data voltages having the same polarity are applied to respective pixels formed along the data lines in a frame, and data voltages having the opposite polarity are applied to respective pixels in the next frame. For convenience in explanation, the above-described driving method is called a row inversion driving method. FIGS. 9A and 9B are schematic layout views explaining a third driving method of the liquid crystal display of FIG. 1A.

FIG. 9A shows polarities of data voltages being applied to pixels of a first frame.

A negative (−) data voltage is applied to the first sub-pixel PX1 of a pixel formed along the first pair of data lines Da and Db, and a positive (+) data voltage is applied to the second sub-pixel PX2 thereof. A positive (+) data voltage is applied to the first sub-pixel PX1 of a pixel formed along the second pair of data lines, and a negative (−) data voltage is applied to the second sub-pixel PX2 thereof. For example, the data voltages having the same polarity are applied to the first sub-pixel PX1 and the second sub-pixel PX2 formed along the pair of data lines Da and Db.

FIG. 9B shows polarities of data voltages applied to pixels of a second frame.

A positive (+) data voltage is applied to the first sub-pixel PX1 of a pixel formed along the first pair of data lines Da and Db, and a negative (−) data voltage is applied to the second sub-pixel PX2 thereof. A negative (−) data voltage is applied to the first sub-pixel PX1 of a pixel formed along the second pair of data lines, and a positive (+) data voltage is applied to the second sub-pixel PX2 thereof. For example, the data voltages having the same polarity are applied to the first sub-pixel PX1 and the second sub-pixel PX2 formed along the pair of data lines.

Comparing FIGS. 9A and 9B with each other, the voltages applied to the first frame and the voltages applied to the second frame are opposite to each other for each pixel line formed along a pair of data lines. For example, since voltages are inverted for each pixel line formed along the pair of data lines for each frame, the data voltages of the whole pixel line formed along the pair of data lines in the next frame have the polarity opposite to that of the data voltages of the pixel line in the previous frame.

Figure 10A:
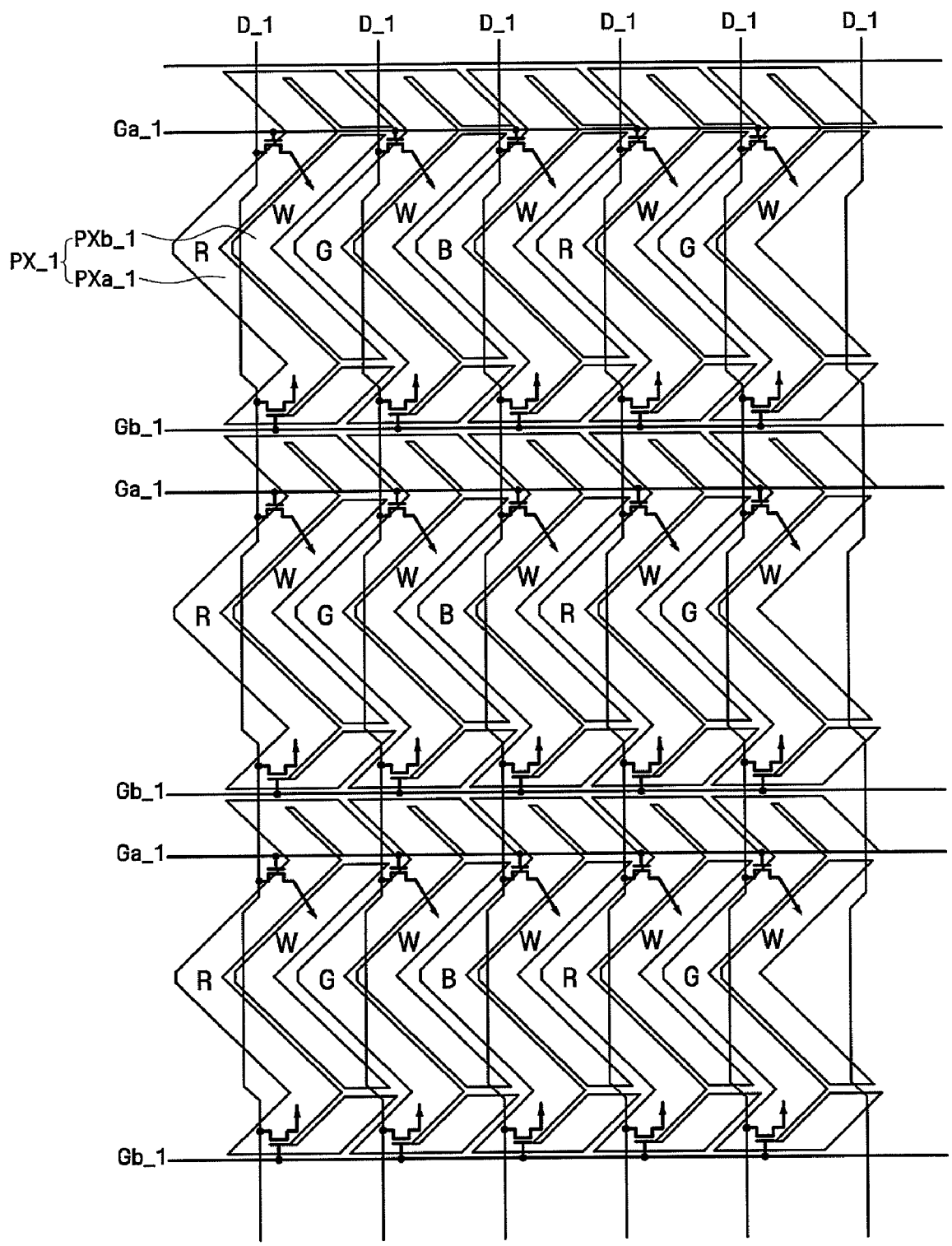
FIG. 10A is a schematic layout view of a pixel arrangement of a liquid crystal display according to an exemplary embodiment of the present invention.
Figure 10B:
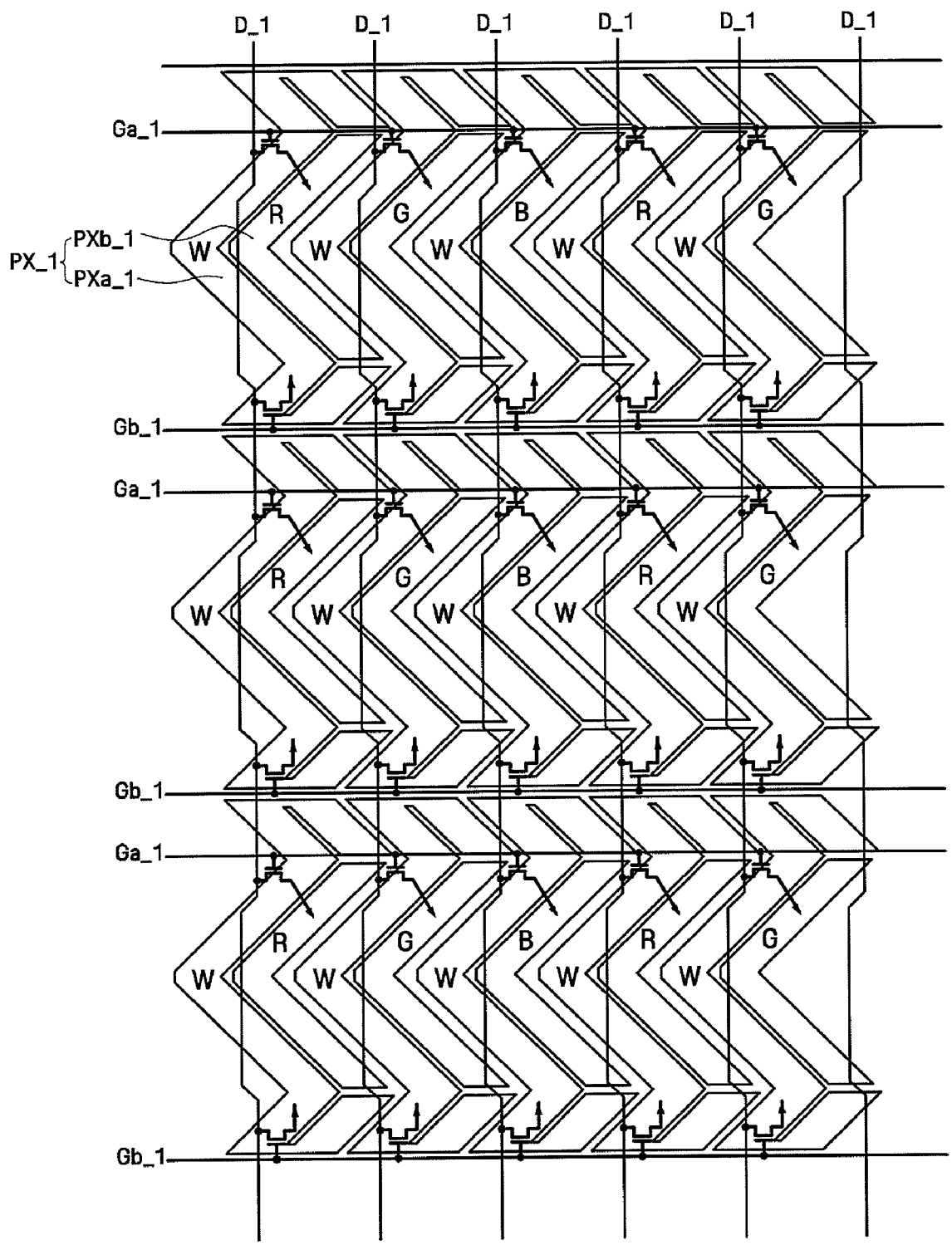
FIG. 10B is a schematic layout view of a pixel arrangement of a liquid crystal display according to an exemplary embodiment of the present invention of FIG. 11A.
Figure 11:
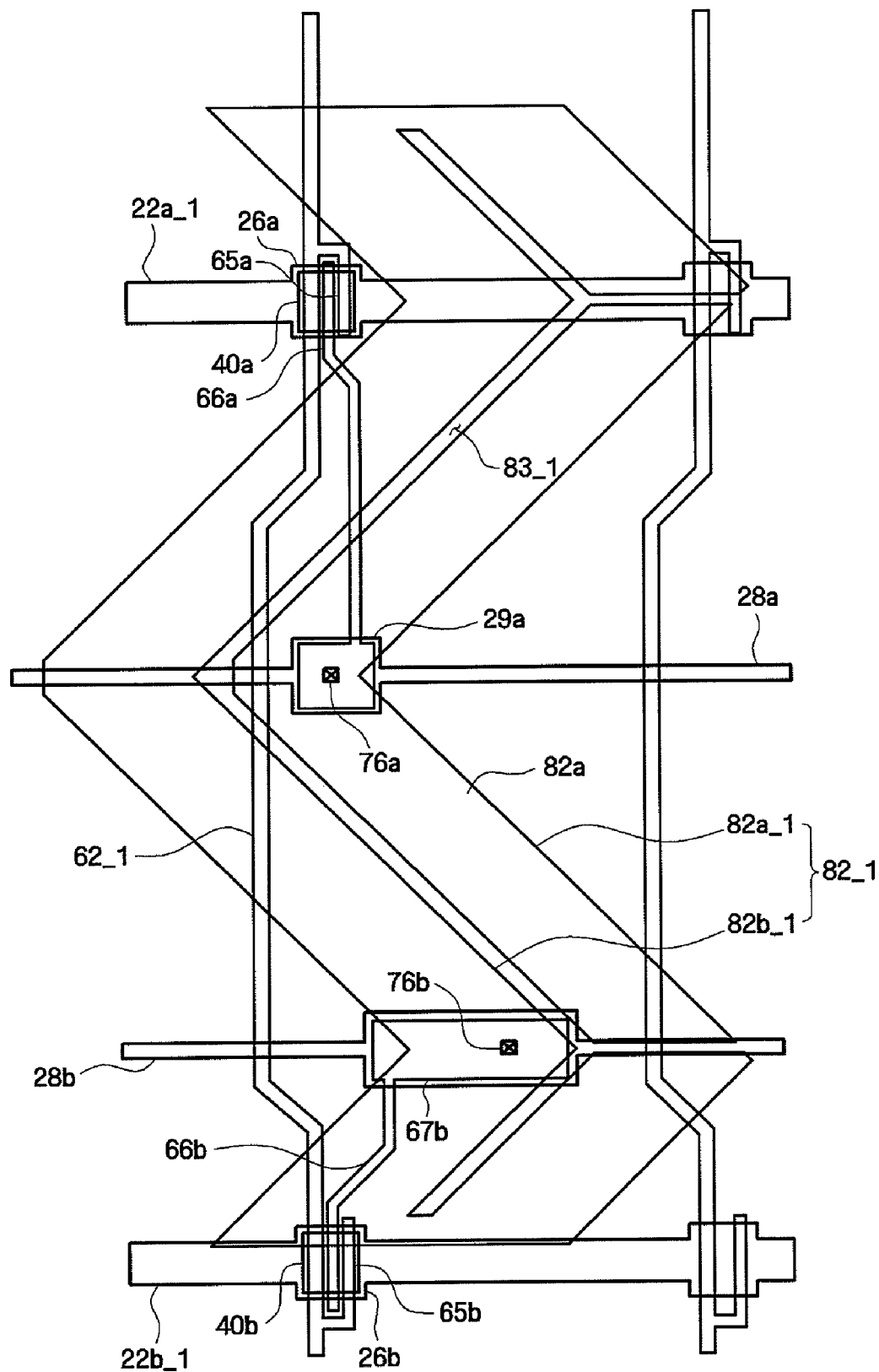
FIG. 11 is a layout view of a pixel of a liquid crystal display of FIG. 10A.

FIG. 10A is a schematic layout view of a pixel arrangement of a liquid crystal display according to an exemplary embodiment of the present invention, and FIG. 10B is a schematic layout view of a pixel arrangement of a liquid crystal display according to an exemplary embodiment of the present invention. FIG. 11 is a layout view of a pixel of a liquid crystal display of FIG. 10A. For convenience in explanation, elements having the same functions as elements described above will be denoted by the same reference numerals.

In the liquid crystal display, a pair of gate lines Ga_1 and Gb_1 is allocated to each pixel, and the pixel is bent in zigzag fashion along a data line D_1. For example, the pixels may form a pattern of chevrons.

Referring to FIG. 10A, on the first substrate, a plurality of gate lines for transferring gate signals and a plurality of data lines for transferring data signals are formed. The gate lines Ga_1 and Gb_1 and the data line D_1 cross each other, and are arranged, for example, in the form of a lattice. In this case, each pixel PX is allocated with a pair of gate lines Ga_1 and Gb_1. Two gate lines Ga_1 and Gb_1 and one data line D_1 are formed for each pixel and drive two switching elements. The two switching elements control the first sub-pixel PXa_1 and the second sub-pixel PXb_1.

The first sub-pixel PXa_1 and the second sub-pixel PXb_1 constitute a pixel PX_1, and the pixel PX_1 may be formed in zigzag fashion along the data line D_1. For example, the pixel PX_1 that is generally formed in zigzag fashion along the data line D_1 may be divided into the first sub-pixel PXa_1 and the second sub-pixel PXb_1. For example, the pixel PX_1 may be formed in a chevron pattern.

The first sub-pixel PXa_1 is a region that emits white light to adjust the contrast, and the second sub-pixel PXb_1 is a region that displays a color. The first sub-pixel PXa_1 and the second sub-pixel PXb_1 are connected to the first switching element and the second switching element, respectively, and are independently driven. By arranging the pixel PX_1 in zigzag fashion as described above, an effective aperture area is widened and thus the whole aperture ratio is increased.

However, the arrangement of the first sub-pixel PXa_1 and the second sub-pixel PXb_1 is not limited to the arrangement described above. For example, as illustrated in FIG. 10B, the first sub-pixel PXa_1 may be used as a region for adjusting the color, and the second sub-pixel PXb_1 may be used as a region for adjusting the contrast.

With reference to FIG. 11, the liquid crystal display according to an exemplary embodiment of the present invention will be described in detail. The liquid crystal display includes a first gate line 22a_1, a second gate line 22b_1, a data line 62_1, a first sub-pixel electrode 82a_1, and a second sub-pixel electrode 82b_1.

The first gate line 22a_1 and the second gate line 22b_1 are arranged in parallel to each other in a horizontal direction. The first gate line 22a_1 and the second gate line 22b_1 may cross the first sub-pixel electrode 82a_1 and the second sub-pixel electrode 82b_1. Since the first sub-pixel electrode 82a_1 and the second sub-pixel electrode 82b_1 are in a zigzag or chevron pattern, and the first gate line 22a_1 and the second gate line 22b_1 are in bent parts of the first sub-pixel electrode 82a_1 and the second sub-pixel electrode 82b_1, the lowering of the aperture ratio can be minimized.

The second sub-pixel electrode 82b_1 surrounds the first sub-pixel electrode 82a_1, and different data voltages are applied to the first sub-pixel electrode 82a_1 and the second sub-pixel electrode 82b_1, so that the visibility can be heightened. For example, one of the first sub-pixel electrode 82a_1 and the second sub-pixel electrode 82b_1 overlaps the color pattern, and the other thereof overlaps the contrast pattern, so that the first sub-pixel electrode 82a_1 and the second sub-pixel electrode 82b_1 can be driven independently.

Figure 12A:
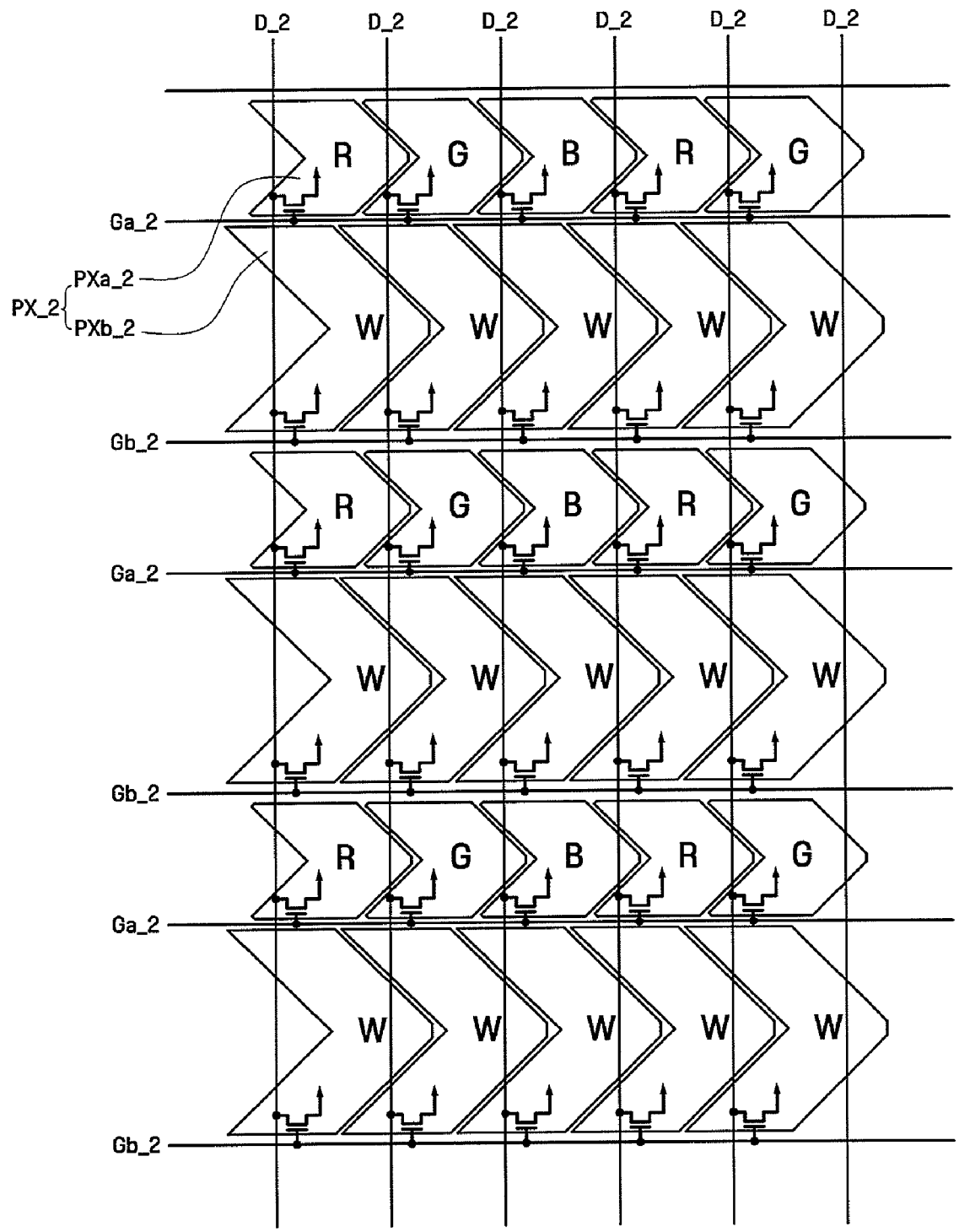
FIG. 12A is a schematic layout view of a pixel arrangement of a liquid crystal display according to an exemplary embodiment of the present invention.
Figure 12B:
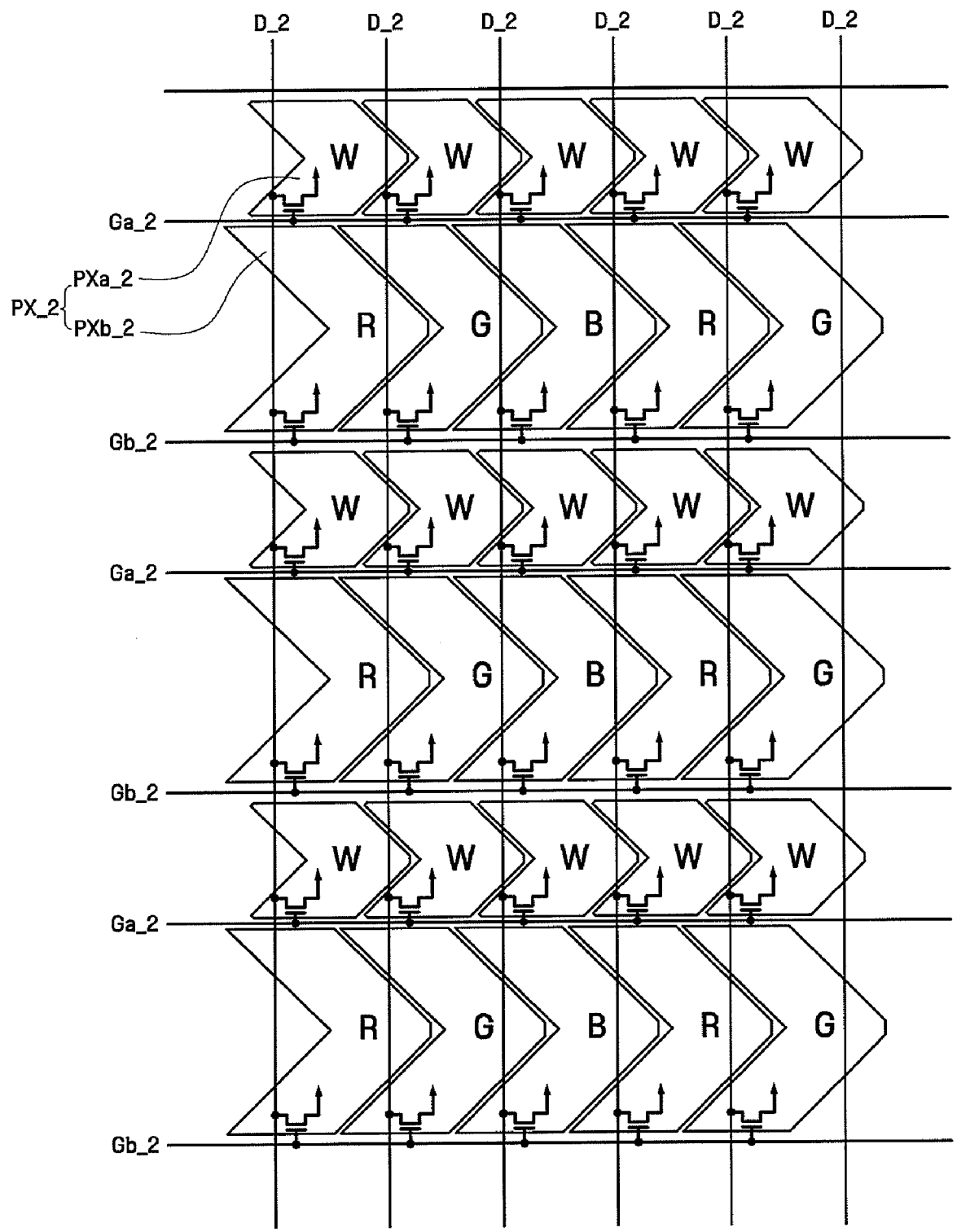
FIG. 12B is a schematic layout view of a pixel arrangement of a liquid crystal display according to an exemplary embodiment of the present invention.
Figure 13:
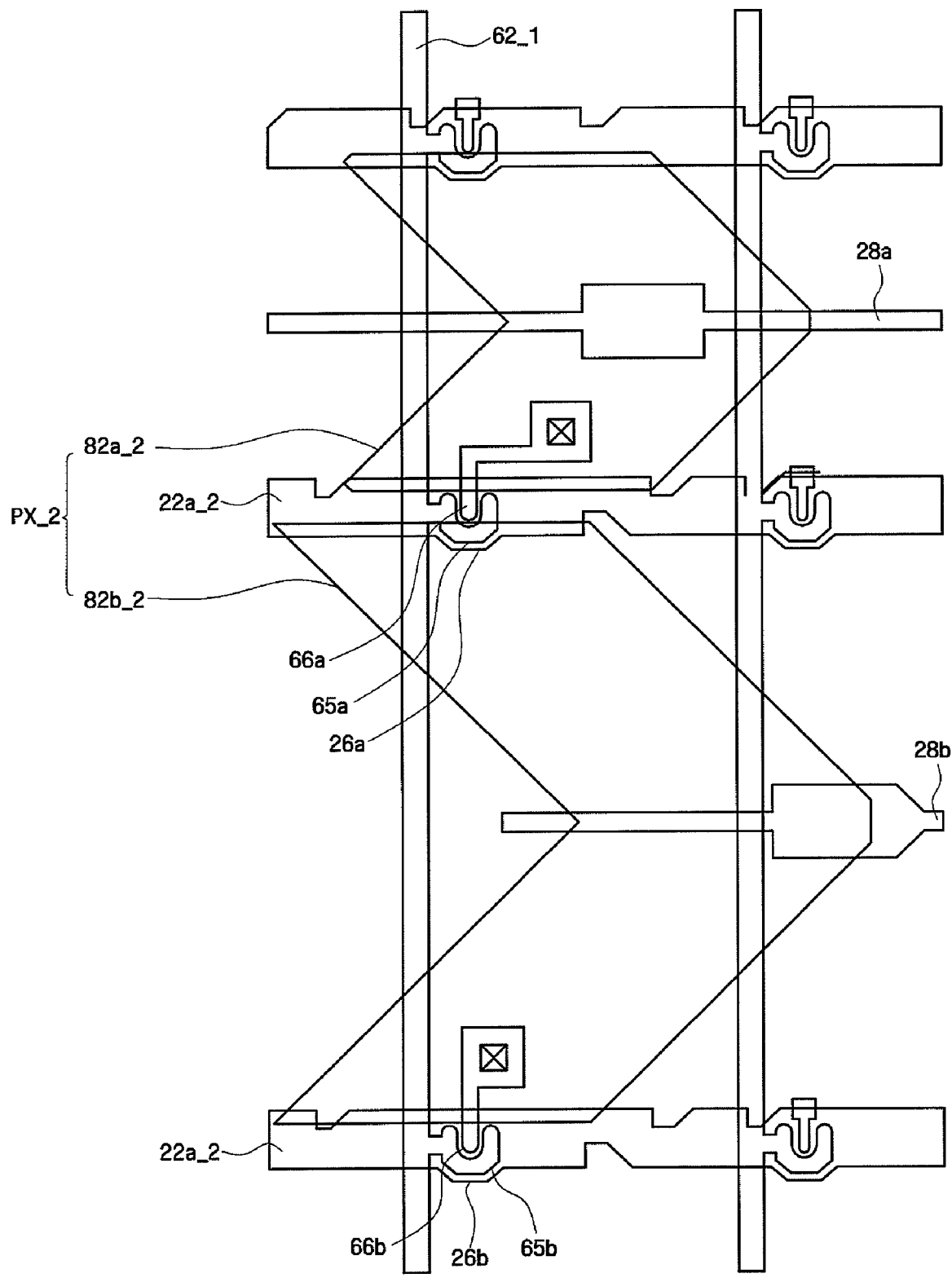
FIG. 13 is a layout view of a pixel of a liquid crystal display of FIG. 12A.

Hereinafter, with reference to FIGS. 12A, 12B, and 13, the pixel arrangement of a liquid crystal display according to an exemplary embodiment of the present invention will be described in detail. Here, FIG. 12A is a schematic layout view of a pixel arrangement of a liquid crystal display according to an exemplary embodiment of the present invention, and FIG. 12B is a schematic layout view of a pixel arrangement of a liquid crystal display according to an exemplary embodiment of the present invention. FIG. 13 is a layout view of a pixel of a liquid crystal display of FIG. 12A. For convenience in explanation, elements having the same functions as elements described above will be denoted by the same reference numerals.

In the liquid crystal display according to an exemplary embodiment of the present invention, a pair of gate lines Ga_2 and Gb_2 is allocated to each pixel, and the pixel PX_2 is bent in zigzag fashion along a data line D_2. For example, the pixel PX_2 may be formed in a chevron pattern. The pixel PX_2 is divided into a first sub-pixel PXa_2 and a second sub-pixel PXb_2, which are alternately arranged along the data line D_2.

Referring to FIG. 12A, on the first substrate, a plurality of gate lines Ga_2 and Gb_2 for transferring gate signals and a plurality of data lines D_2 for transferring data signals are formed. The gate lines Ga_2 and Gb_2 and the data line D_2 cross each other, and are arranged, for example, in the form of a lattice. In this case, each pixel PX_2 is allocated with a pair of gate lines Ga_2 and Gb_2. Two gate lines Ga_2 and Gb_2 and one data line D_2 are formed for each pixel to drive two switching elements. The two switching elements control the first sub-pixel PXa_2 and the second sub-pixel PXb_2. The pixel PX_2 is divided into a first sub-pixel PXa_2 and a second sub-pixel PXb_2, which are alternately arranged along the data line D_2.

Particularly, a high definition liquid crystal display may be implemented with a reduced size of a pixel PX_2. If the size of the pixel PX_2 is reduced, the serial arrangement of the first sub-pixel PXa_2 and the second sub-pixel PXb_2 along the data line D_2 helps to secure the aperture ratio for the display. For example, by alternately arranging the first sub-pixel PXa_2 and the second sub-pixel PXb_2 along the data line D_2 as maintaining the whole shape of the pixel PX_2 in zigzag fashion, the aperture ratio can be secured and the viewing angle can be widened.

The first sub-pixel PXa_2 is a region for displaying the color and the second sub-pixel PXb_2 is a region for adjusting the contrast. The first sub-pixel PXa_2 and the second sub-pixel PXb_2 are connected to the first switching element and the second switching element, respectively, and are independently driven.

The arrangement of the first sub-pixel PXa_2 and the second sub-pixel PXb_2 is not limited to that as described above. For example, as illustrated in FIG. 12B, the first sub-pixel PXa_2 may be used as a region for adjusting the contrast, and the second sub-pixel PXb_2 may be used as a region for adjusting the color.

With reference to FIG. 13, the liquid crystal display according to an exemplary embodiment of the present invention will be described in detail. The liquid crystal display includes a first gate line 22a_2, a second gate line 22b_2, a data line 62_2, a first sub-pixel electrode 82a_2, and a second sub-pixel electrode 82b_2.

The first gate line 22a_2 and the second gate line 22b_2 are arranged in parallel to each other in a horizontal direction. The first sub-pixel electrode 82a_2, and the second sub-pixel electrode 82b_2 may be alternately formed along the data line 62_2, with the first gate line 22a_2 and the second gate line 22b_2 determined as a boundary. The first sub-pixel electrode 82a_2 and the second sub-pixel electrode 82b_2 may be in the form of a "V" rotated by 90°, and the two sub-pixel electrodes may have different sizes.

By arranging the first sub-pixel electrode 82a_2 and the second sub-pixel electrode 82b_2 in the form of a "V" rotated by 90° along the data line 62_2, the pixel electrode may be formed in a zigzag fashion, for example, in a pattern of chevrons.

One of the first sub-pixel electrode 82a_2 and the second sub-pixel electrode 82b_2 overlaps the color pattern and the other thereof overlaps the contrast pattern to define a region for displaying the color and a region for adjusting the contrast. The first sub-pixel electrode 82a_2 and the second sub-pixel electrode 82b_2 can be driven independently.

Although exemplary embodiments of the present invention have been described for illustrative purposes, those skilled in the art will appreciate that various modifications, additions and substitutions are possible, without departing from the scope and spirit of the invention.

What is claimed is:

1. A liquid crystal display comprising:
a first insulating substrate;
a gate line and a data line crossing each other on the first insulating substrate defining a pixel;
first and second sub-pixel electrodes dividing the pixel into two parts;
a first switching element driving the first sub-pixel electrode;
a second switching element driving the second sub-pixel electrode;
a second insulating substrate facing the first insulating substrate;
a color pattern arranged on the second insulating substrate and overlapping the first sub-pixel electrode; and
a contrast pattern overlapping the second sub-pixel electrode.

2. The liquid crystal display of claim 1, wherein the color pattern includes at least one of a red pattern, a green pattern, or a blue pattern.

3. The liquid crystal display of claim 1, wherein the contrast pattern includes a white pattern.

4. The liquid crystal display of claim 1, wherein an area ratio of the color pattern to the contrast pattern is in the range of 1:0.5 to 1:2.

5. The liquid crystal display of claim 1, wherein the color pattern includes a red pattern, a green pattern, and a blue pattern, repeatedly arranged, along the gate line or the data line.

6. The liquid crystal display of claim 1, wherein the first sub-pixel electrode and the second sub-pixel electrode are divided into one or more domains each slanted at an angle of about 45° or −45° to the gate line.

7. The liquid crystal display of claim 1, wherein the first sub-pixel electrode surrounds at least part of the second sub-pixel electrode or the second sub-pixel electrode surrounds at least a part of the first sub-pixel electrode.

8. The liquid crystal display of claim 1, wherein voltages applied to the first sub-pixel electrode and the second sub-pixel electrode are inverted from each other based on a common voltage for each frame.

9. The liquid crystal display of claim 1, wherein the same voltage is applied to the first sub-pixel electrode and the second sub-pixel electrode along the gate line or the data line in a frame, and an inverted voltage, based on a common voltage, is applied to the first sub-pixel electrode and the second sub-pixel electrode in a next frame.

10. The liquid crystal display of claim 1, wherein a positive voltage and a negative voltage, based on a common voltage, are alternately applied to the first sub-pixel electrode and the second sub-pixel electrode along the gate line or the data line in a frame, and inverted voltages, based on the common voltage, are applied to the first sub-pixel electrode and the second sub-pixel electrode in a next frame.

11. A liquid crystal display comprising:
a first insulating substrate;
first and second gate lines arranged in parallel with each other on the first insulating substrate;
a data line crossing the first and second gate lines;
a first sub-pixel electrode electrically connected to the first gate line and the data line;
a second sub-pixel electrode electrically connected to the second gate line and the data line;
a second insulating substrate facing the first insulating substrate;
a color pattern arranged on the second insulating substrate and overlapping the first sub-pixel electrode; and
a contrast pattern overlapping the second sub-pixel electrode;
wherein the first and second sub-pixel electrodes are formed in a pattern of chevrons along the data line.

12. The liquid crystal display of claim 11, wherein the color pattern includes at least one of a red pattern, a green pattern, or a blue pattern.

13. The liquid crystal display of claim 11, wherein the contrast pattern includes a white pattern.

14. The liquid crystal display of claim 11, wherein an area ratio of the color pattern to the contrast pattern is in the range of 1:0.5 to 1:2.

15. The liquid crystal display of claim 11, wherein the color pattern includes a red pattern, a green pattern, and a blue pattern, repeatedly arranged, along the gate line or the data line.

16. The liquid crystal display of claim 11, wherein the first sub-pixel electrode surrounds at least part of the second sub-pixel electrode or the second sub-pixel electrode surrounds at least a part of the first sub-pixel electrode.

17. The liquid crystal display of claim 11, wherein the first sub-pixel electrode and the second sub-pixel electrode are alternately arranged along the data line.

18. The liquid crystal display of claim 11, wherein voltages applied to the first sub-pixel electrode and the second sub-pixel electrode are inverted from each other based on a common voltage for each frame.

19. The liquid crystal display of claim 11, wherein the same voltage is applied to the first sub-pixel electrode and the second sub-pixel electrode along the gate line or the data line in a frame, and an inverted voltage, based on a common voltage, is applied to the first sub-pixel electrode and the second sub-pixel electrode in a next frame.

20. The liquid crystal display of claim 11, wherein a positive voltage and a negative voltage, based on a common voltage, are alternately applied to the first sub-pixel electrode and the second sub-pixel electrode along the gate line or the data line in a frame, and inverted voltages, based on the common voltage, are applied to the first sub-pixel electrode and the second sub-pixel electrode in a next frame.

* * * * *